United States Patent
Matsuo et al.

(10) Patent No.: US 7,606,460 B2
(45) Date of Patent: Oct. 20, 2009

(54) OPTICAL FIBER AND TRANSMISSION SYSTEM, AND WAVELENGTH DIVISION MULTIPLEXING SYSTEM

(75) Inventors: Shoichiro Matsuo, Sakura (JP); Shoji Tanigawa, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/738,275

(22) Filed: Apr. 20, 2007

(65) Prior Publication Data

US 2007/0189699 A1  Aug. 16, 2007

Related U.S. Application Data

(63) Continuation of application No. PCT/JP2005/019493, filed on Oct. 24, 2005.

(30) Foreign Application Priority Data

| Oct. 22, 2004 | (JP) | ............................. 2004-308359 |
| Mar. 1, 2005 | (JP) | ............................. 2005-055669 |
| Jul. 19, 2005 | (JP) | ............................. 2005-208687 |

(51) Int. Cl.
    *G02B 6/00* (2006.01)
(52) U.S. Cl. .......................... 385/142; 385/123; 65/398
(58) Field of Classification Search ......... 385/123–128, 385/141–145; 65/397, 398
    See application file for complete search history.

(56) References Cited

U.S. PATENT DOCUMENTS

| 4,822,399 A | 4/1989 | Kanamori et al. |
| 5,210,816 A | 5/1993 | Iino et al. |
| 5,267,339 A | 11/1993 | Yamauchi et al. |
| 6,205,279 B1 | 3/2001 | Kim et al. |
| 6,542,683 B1 | 4/2003 | Evans et al. |
| 6,647,190 B2 * | 11/2003 | Matsuo et al. .............. 385/123 |
| 2002/0061175 A1 * | 5/2002 | Matsuo et al. .............. 385/123 |
| 2002/0102085 A1 | 8/2002 | Arai et al. |

FOREIGN PATENT DOCUMENTS

| JP | 62-292647 A | 12/1987 |
| JP | 63-281106 A | 11/1988 |
| JP | 63281106 | 11/1988 |
| JP | 5-2118 A | 1/1993 |
| JP | 5-301736 A | 11/1993 |
| JP | 05301736 | 11/1993 |
| JP | 9-218319 A | 8/1997 |

(Continued)

OTHER PUBLICATIONS

A. R. Chraplyvy, "Limitations on Lightwave Communications Imposed by Optical-Fiber Nonlinearities", Journal of Lightwave Technology, vol. 8, No. 10, Oct. 1990, pp. 1548-1557.

(Continued)

*Primary Examiner*—Kevin S Wood
(74) *Attorney, Agent, or Firm*—Sughrue Mion, PLLC

(57) ABSTRACT

An optical fiber comprises a center core and a cladding located at an outer periphery of the core, wherein the core comprises at least one codoped layer made from silica glass doped with germanium and fluorine, and at least one lower-concentration codoped layer made from silica glass doped with germanium, or silica glass that is doped with germanium and fluorine wherein an amount of fluorine in the lower-concentration codoped layer is smaller than an amount of fluorine in the codoped layer.

19 Claims, 25 Drawing Sheets

FOREIGN PATENT DOCUMENTS

| | | |
|---|---|---|
| JP | 09218319 | 8/1997 |
| JP | 11-218633 A | 8/1999 |
| JP | 2001-510903 A | 8/2001 |
| JP | 2002-365469 A | 12/2002 |
| KR | 1990-0003449 B1 | 5/1990 |
| RU | 2215310 C2 | 8/2007 |
| RU | 2216755 C2 | 8/2007 |

OTHER PUBLICATIONS

K. Shiraki, et al., "SBS Threshold of a Fiber with a Brillouin Frequency Shift Distribution", Journal of Lightwave Technology, vol. 14, No. 1, Jan. 1996, pp. 50-57.

Das, et al., "Coarse-WDM throughput of up to 20 Gb/s in the 1300-1440 nm region over 63 km of low water peak fiber", 2001 Technical Proceedings of the National Fiber Optic Engineers Conference (NFOEC2001), 2001, pp. 850-855.

ITU-T Recommendation G.652, "Series G: Transmission Systems and Media, Digital Systems and Networks. Transmission media characteristics—Optical fibre cables: Characteristics of a single-mode optical fibre and cable", Mar. 2003, International Telecommunication Union.

ITU-T Recommendation G.983.3, "Series G: Transmission Systems and Media, Digital Systems and Networks. Digital sections and digital line system—Optical line systems for local and access networks: A broadband optical access system with increased service capability by wavelength allocation", Mar. 2001, International Telecommunication Union.

Koyamada, Y. et al., "Simulating and Designing Brillouin Gain Spectrum in Single-Mode Fibers" In: Journal of Lightwave Technology, Feb. 2004, vol. 22, No. 2, pp. 631-639.

* cited by examiner

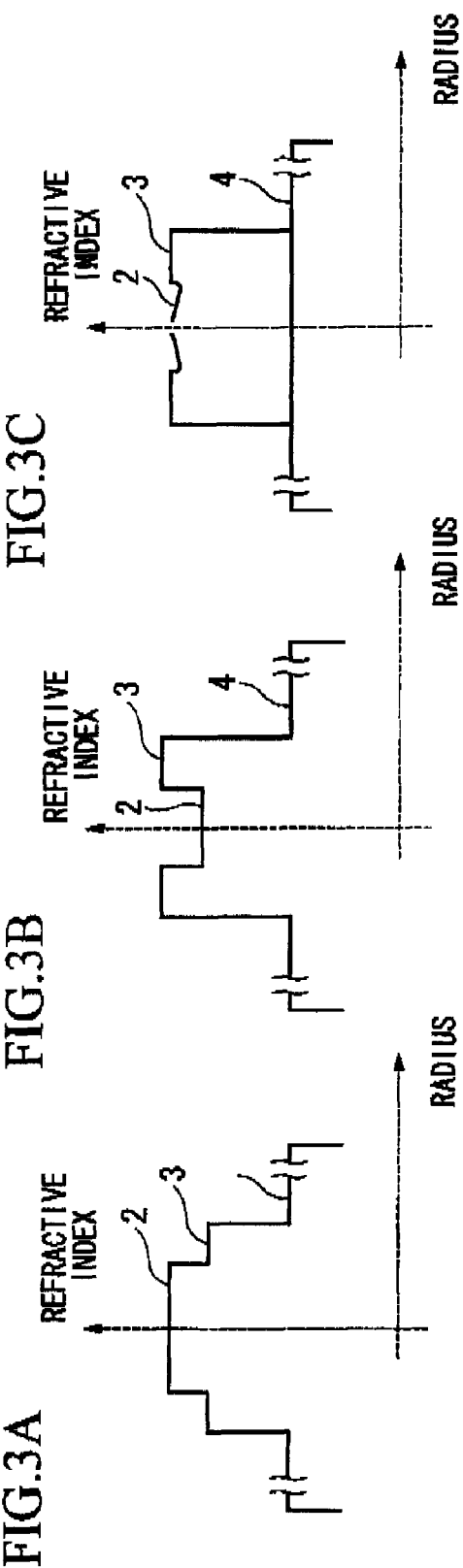
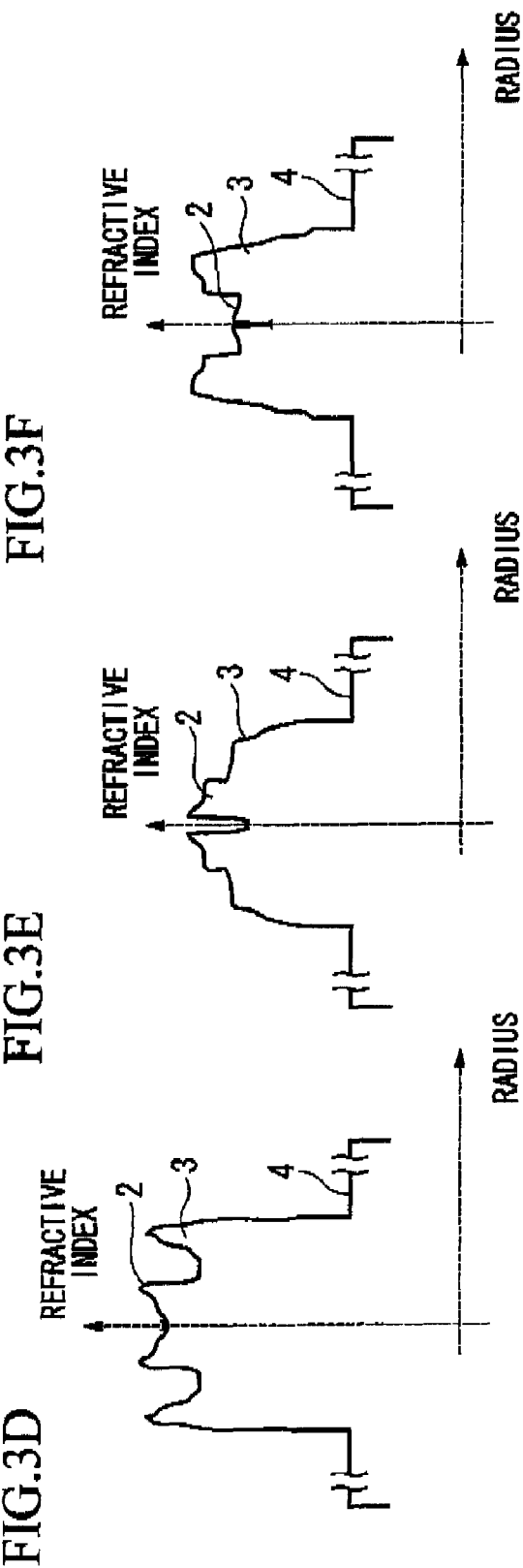

OPTICAL FIBER AND TRANSMISSION SYSTEM, AND WAVELENGTH DIVISION MULTIPLEXING SYSTEM

TECHNICAL FIELD

The present invention relates to an optical fiber that suppresses the occurrence of Simulated Brillouin Scattering (hereinafter referred to as SBS) to allow transmission of higher-power signals. The present invention also relates to a transmission system and a wavelength division multiplexing system using this optical fiber.

Priority is claimed from Japanese Patent Application No. 2004-308359 filed on Oct. 22, 2004, Japanese Patent Application No. 2005-55669 filed on Mar. 1, 2005, and Japanese Patent Application No. 2005-208687 filed on Jul. 19, 2005, the contents of which are incorporated herein by reference.

BACKGROUND ART

Nowadays, fiber to the home (hereinafter referred to as FTTH) service is available in which optical fibers are extended to individual homes to be used for exchange of various information.

As one form of FTTH that transmits various information, there is a system in which a broadcast signal and another communication signal are simultaneously transmitted in different systems by means of a single optical fiber (ITU-T Recommendation G.652). Generally in this system, the broadcast signal is often an analog signal or a baseband signal.

The characteristics of the system having an optical fiber as a transmission medium are as follows:

FTTH is typically a double-star type PON (Passive Optical Network), and has a large distribution loss (typically, up to 32 branches are assumed).

Since FTTH transmits an analog signal or a baseband signal, a CNR (Carrier to Noise Ratio) in the receiver is required to be high, and the required minimum signal light power in the light receiving portion is larger compared with the case of digital transmission used for communication.

In the system described above, the signal light power in the signal input portion needs to be large. Especially in consideration of attenuation and distribution loss during transmission of a signal light, higher power is required in a line with a longer distance or more branches. If a signal can be transmitted as far as possible and distributed to many subscribers at a time, it is more advantageous from various points of view (construction costs, maintainability, system design, etc.).

However, in an optical transmission using an optical fiber, even if light with more than a certain power is intended to be injected into an optical fiber, SBS, which is one type of non-linear phenomenon, allows the entrance of light with a certain amount of power (hereinafter, referred to as SBS threshold power) or less and the rejected light is returned to the entrance light side as backscattered light. This phenomenon sometimes puts restrictions on signal light power in the input portion, thus posing a problem (for example, see Non-Patent Document 1).

Conventionally, as methods for achieving SBS suppression, techniques for modifying optical characteristics in the longitudinal direction, the dopant concentrations, and the residual stress have been reported (see, for example, Patent Document 1 and Non-Patent Document 2).

Non-Patent Document 1: A. R. Charaplyvy, J. Lightwave Technol., vol. 8, pp. 1548-1557 (1990)

Patent Document 1: U.S. Pat. No. 5,267,339

Non-Patent Document 2: K. Shiraki, et al., J. Lightwave Technol., vol. 14, pp. 50-57 (1996)

DISCLOSURE OF THE INVENTION

Problem to be Solved by the Invention

However, the SBS suppression methods described in Patent Document 1 and Non-Patent Document 2 inevitably modify optical characteristics in the longitudinal direction of optical fibers, which makes the methods undesirable in practice.

The present invention has been achieved in view of the above circumstances, and has an object to provide an optical fiber that can enhance the SBS threshold power compared to conventional optical fibers, and to provide a transmission system and wavelength division multiplexing system using the same.

Means for Solving the Problem

To achieve the above-mentioned object, the present invention provides an optical fiber comprising a center core and a cladding located at an outer periphery of the core, wherein the core comprises at least one codoped layer comprising silica glass doped with germanium and fluorine, and at least one lower-concentration codoped layer comprising one of silica glass doped with germanium, and silica glass that is doped with germanium and fluorine; wherein an amount of fluorine in the lower-concentration codoped layer is smaller than an amount of fluorine in the codoped layer.

In the optical fiber according to the present invention, preferably, the center core comprises an inner core located in the vicinity of a radial center of the fiber and an outer core provided at an outer periphery of the inner core, the inner core comprises the codoped layer, and the outer core comprises the lower-concentration codoped layer.

In the optical fiber according to the present invention, preferably, the cladding comprises non-doped silica glass.

Preferably, in the optical fiber of the present invention, the cladding comprises a fluorine dopant.

Preferably, in the optical fiber of the present invention, the cladding comprises an inner cladding provided at an outer periphery of the core and an outer cladding provided at an outer periphery of the inner cladding, and the relationship: $n_{c1} < n_{c2}$ holds, wherein a refractive index of the inner cladding is $n_{c1}$ and a refractive index of the outer cladding is $n_{c2}$.

Preferably, in the optical fiber of the present invention, the cladding comprises an inner cladding provided at an outer periphery of the core, a trench layer provided at an outer periphery of the inner cladding, and an outer cladding provided at an outside of the trench layer, and the relationships: $n_{c2} < n_{c1}$ and $n_{c2} < n_{c3}$ hold, wherein a refractive index of the inner cladding is $n_{c1}$, a refractive index of the trench layer is $n_{c2}$, and a refractive index of the outer cladding is $n_{c3}$.

Preferably, in the optical fiber of the present invention, a concentration of germanium oxide is in a range between 4% and 15% by mass, and a concentration of the fluorine is in a range between 0.2% and 5% by mass, in the inner core.

Preferably, in the optical fiber of the present invention, a ratio of an inner core radius and an outer core radius is in a range between 0.10 and 0.85.

Preferably, in the optical fiber of the present invention, the ratio of the inner core radius and the outer core radius is in a range between 0.25 and 0.70.

In the optical fiber of the present invention, optical refractive indices of the inner core and the outer core may be configured to be substantially the same.

Preferably, in the optical fiber of the present invention, a relative refractive index differences between the cladding and an average of the inner core and the outer core is in a range between 0.30% and 0.60%, and an outer core diameter is in a range between 6.0 µm and 10.5 µm.

Preferably, in the optical fiber of the present invention, the core comprises a first core located in the vicinity of a radial center of the fiber, a second core provided at an outer periphery of the first core, and a third core provided at an outer periphery of the second core. The first core and the third core comprise the codoped layer, and the second core comprises the lower-concentration codoped layer.

Preferably, in the optical fiber of the present invention, the relationships: $n_{f1} > n_{f2}$ and $n_{f3} > n_{f2}$ hold, wherein a fluorine concentration of is $n_{f1}$ % by mass, a fluorine concentration of the second core is $n_{f2}$ % by mass, and a fluorine concentration of the third core is $n_{f3}$ % by mass.

In the above optical fiber, $n_{f1}$ and $n_{f3}$ may be substantially the same.

In the above optical fiber, the relationship: $n_{f1} < n_{f3}$ may hold.

In the above optical fiber, the relationship: $n_{f1} > n_{f3}$ may hold.

Preferably, in the optical fiber of the present invention, optical characteristics satisfy the requirements of ITU-T Recommendation G.652.

Furthermore, the present invention provides a transmission system configured to perform an analog signal transmission or a baseband transmission using the above-mentioned optical fiber according to the present invention described above.

Furthermore, the present invention provides a wavelength division multiplexing system configured to perform a data transmission and/or a voice transmission, in addition to an analog signal transmission and/or a baseband transmission using the above-mentioned optical fiber according to the present invention described above.

Advantageous Effects of the Invention

The present invention can provide an optical fiber that suppresses the occurrence of SBS to allow transmission with higher power signals, and a transmission system and a wavelength division multiplexing system that enable multi-branched, long-distance transmission using the optical fiber.

BRIEF DESCRIPTION OF THE DRAWINGS

FIG. 3A is a diagram illustrating the refractive index profile of an exemplary optical fiber of the present invention.

FIG. 3B is a diagram illustrating the refractive index profile of an exemplary optical fiber of the present invention.

FIG. 3C is a diagram illustrating the refractive index profile of an exemplary optical fiber of the present invention.

FIG. 3D is a diagram illustrating the refractive index profile of an exemplary optical fiber of the present invention.

FIG. 3E is a diagram illustrating the refractive index profile of an exemplary optical fiber of the present invention.

FIG. 3F is a diagram illustrating the refractive index profile of an exemplary optical fiber of the present invention.

DESCRIPTION OF THE REFERENCE SYMBOLS

1 . . . Optical fiber
2 . . . Inner core
3 . . . Outer core
4 . . . Cladding
10 . . . Optical transmission system (wavelength division multiplexing system).

BEST MODE FOR CARRYING OUT THE INVENTION

Hereunder is a description of exemplary embodiments of the present invention with reference to the drawings.

Figure 1:
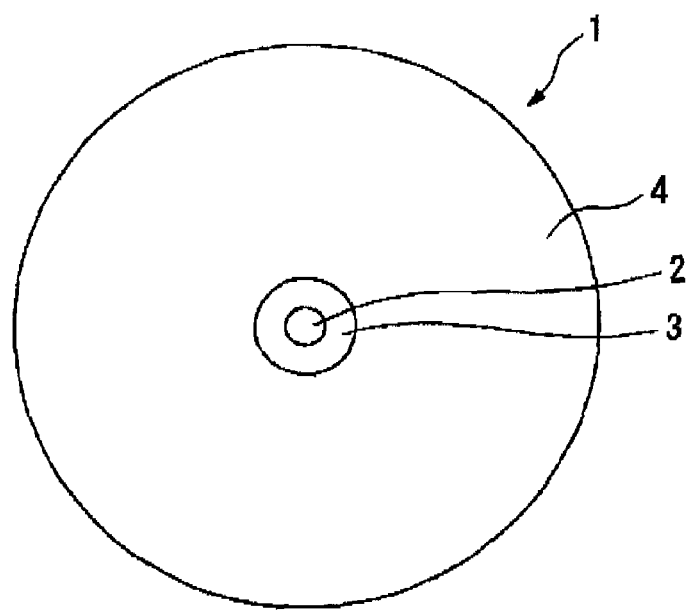
FIG. 1 is a cross-sectional view showing one exemplary embodiment of an optical fiber of the present invention.

FIG. 1 is a diagram showing one embodiment of the optical fiber according to the present invention. An optical fiber 1 of this embodiment comprises an inner core 2 that is made from silica glass doped with germanium and fluorine, an outer core 3 that is provided at the outer periphery of the inner core 2 and is made from silica glass doped with germanium, or silica glass that is doped with germanium and fluorine wherein the dopant amount of fluorine is smaller than the dopant amount of fluorine in the inner core 2, and a cladding 4 that is provided at the outer periphery of the outer core 3. This structure can suppress the occurrence of SBS that is problematic in transmission through optical fibers, increase the SBS threshold power, and allow transmission with higher-power signals.

Preferably, but not necessarily, the concentration of germanium is in a range between about 4% and 15% by mass in terms of germanium oxide, and the concentration of fluorine is in a range between about 0.2% and 5% by mass, in the inner core 2. If the concentrations of germanium and fluorine in the inner core 2 are greater than the above ranges, the transmission loss in the optical fiber 1 is increased due to an increase in the Rayleigh scattering, which may become problematic in practice. In contrast, the concentrations of germanium and fluorine in the inner core 2 are smaller than the above ranges, the advantage of increasing SBS threshold power may become smaller, which may hinder achieving the objects of the present invention.

Furthermore, it is desired that the ratio of the inner core radius and the outer core radius be in a range between about 0.10 and 0.85. By setting the ratio of the inner core radius and the outer core radius within the above range, an SBS threshold power of about 1.5 times higher than those of typical single-mode optical fibers (hereinafter referred to as typical SM optical fibers) can be obtained.

Furthermore, it is more preferable that the ratio of the inner core radius and the outer core radius be in a range between about 0.25 and 0.70. By setting the ratio of the inner core radius and the outer core radius within the above range, it becomes possible to increase the SBS threshold power about 2 times higher than those of typical SM optical fibers.

Furthermore, it is desired that the optical refractive indices of the inner core 2 and the outer core 3 be substantially the same. If the optical refractive indices of the inner core 2 and the outer core 3 are different, the waveguide dispersion (also known as structure dispersion) in the optical fiber shifts to the longer-wavelength side, which may make controlling optical characteristics within desired ranges difficult. Here, "optical refractive indices are substantially the same" assumes that each difference of refractive indices is about 0.07% or less in terms of relative refractive index difference (A). However, since the inner core 2 and the outer core 3 may have some degree of unevenness of the refractive indices in the radial direction caused by non-uniformity in manufacturing, it should be noted that making comparisons between average refractive indices of the inner core 2 and the outer core 3 is appropriate. It should be also noted that, here, a "desired range" means a range that satisfies the requirements of ITU-T Recommendation G.652, for example. Among the characteristics defined by G.652, at least having the comparative chromatic dispersion characteristic is very important when designing transmission lines. In other cases, it would be sufficient that no considerable deviation from the optical characteristics of existing optical fibers in various types is introduced by adapting a structure according to the present invention.

Furthermore, in order to obtain optical characteristics satisfying the requirements of ITU-T Recommendation G.652, it is required that the average value of the optical refractive index of the entire core region, including the inner core 2 and the outer core 3, be in a range between about 0.30% and 0.40% as a relative refractive index difference with respect to the cladding 4, and that the outer core diameter be in a range between 7.5 μm and 11 μm.

Optical fibers that have the above-described structure of the present invention and exhibits optical characteristics satisfying the requirements of ITU-T Recommendation G.652 have an advantage in that they can be used in the same manner as conventional optical fibers since they have the same optical characteristics as those of optical fibers constituting existing transmission paths, except for having higher SBS threshold power.

FIGS. 3A-3F are diagrams illustrating refractive index profiles in the radial direction of exemplary optical fibers according to the present invention. However, the present invention is not limited to these illustrations.

An optical fiber having the refractive index profile shown in FIG. 3A has a stepped refractive index profile and comprises an inner core 2 that has the highest refractive index, an outer core 3 that is provided at the outer periphery of the inner core 2 and has a smaller refractive index than that of the inner core 2, and a cladding 4 that is provided at the outer periphery of the outer core 3 and is made from silica glass.

An optical fiber having the refractive index profile shown in FIG. 3B has a stepped refractive index profile and comprises an inner core 2, an outer core 3 that is provided at the outer periphery of the inner core 2 and has a higher refractive index than that of the inner core 2, and a cladding 4 that is provided at the outer periphery of the outer core 3 and is made from silica glass.

An optical fiber having the refractive index profile shown in FIG. 3C that has the refractive index profile and comprises an inner core 2, in which the refractive index is gradually increased towards the center, an outer core 3 that is provided at the outer periphery of the inner core 2, and a cladding 4 that is provided at the outer periphery of the outer core 3 and is made from silica glass.

An optical fiber having the refractive index profile shown in FIG. 3D comprises an inner core 2 that has higher refractive index in the vicinity of the outer periphery than in the center, an inner core 3 that is provided at the outer periphery of the inner core 2 and has higher refractive index in the vicinity of the outer periphery, and a cladding 4 that is provided at the outer periphery of the outer core 3 and is made from silica glass.

An optical fiber having the refractive index profile shown in FIG. 3E comprises an inner core 2 that has an approximately indented refractive index profile in which the refractive index is smaller in a center portion, an outer core 3 that is provided at the outer periphery of the inner core 2 and has the refractive index profile in which the refractive index of the outer periphery portion is gradually decreased, and a cladding 4 that is provided at the outer periphery of the outer core 3 and is made from silica glass.

An optical fiber having the refractive index profile shown in FIG. 3F comprises an inner core 2 having a wedge-shaped low-refractive index portion at a center portion, an outer core 3 that is provided at the outer periphery of the inner core 2 and has a refractive index profile in which the refractive index is higher than that of the inner core 2 and is gradually decreased towards the outer periphery, and a cladding 4 that is provided at the outer periphery of the outer core 3 and is made from silica glass.

The present invention also provides a transmission system using the optical fiber according to the present invention described above.

An advantage of using the above-described optical fiber of the present invention is that a signal light with higher power can be introduced. Therefore, performing an analog transmission or a baseband transmission that requires comparatively high power using the optical fiber of the present invention enables a longer-distance transmission with more branches, and thus great benefits can be obtained. Especially in a system with a transmission distance of 15 km or longer and/or 32 branches or more, the greatest benefits can be obtained.

Furthermore, by use of an optical fiber according to the present invention, wavelength division multiplexing can also be performed in which another transmission can be performed simultaneously with the above-described analog transmission or baseband transmission. As for wavelength division multiplexing, one form of FTTH shown in ITU-T G.983.3, CWDM, or the like can be conceived. Especially in a system with a transmission distance of 15 km or longer and/or 32 branches or more, the greatest benefits can be obtained.

There is no need to limit the optical fiber of the present invention to these applications in a transmission system. For example, it can be used not only in a typical public data communication, but also in a digital, long-distance relay-free transmission system, an intelligent transportation system (ITS), a sensor, a remote laser cutting system, etc.

EXAMPLES

First Embodiment

Optical fibers according to a first embodiment of the present invention were prototyped. Tables 1-3 show Examples Nos. 2-25 of optical fibers prototyped, together with their structures and optical characteristics. Furthermore, a typical SM optical fiber (compliant with ITU-T Recommendation G.652) is also shown in Table 1 in No. 1 as a comparative example. It should be noted that, in Tables 1-3, "Ge concentration" indicates concentrations of germanium doped into the inner core or the outer core (in terms of germanium oxide), and "F concentration" indicates concentrations of fluorine doped into the inner core or the outer core. Furthermore, as for the optical fiber of each of Examples Nos. 2-25, "rel. Brillouin gain" shows relative values of the SBS light intensity measured in the optical fiber of each Example when the value of the SBS light intensity measured in the optical fiber of the comparative example was taken as 1. Similarly, "threshold power" shows relative values of the SBS threshold power measured in the optical fiber of each Example when the value of the SBS threshold power measured in the optical fiber of the comparative example was taken as 1.

TABLE 1

| | Unit | 1 Com. | 2 Ex. | 3 Ex. | 4 Ex. | 5 Ex. | 6 Ex. | 7 Ex. | 8 Ex. | 9 Ex. | 10 Ex. |
|---|---|---|---|---|---|---|---|---|---|---|---|
| Inner core Ge concentration | % by mass | 3.2 | 4.3 | 4.1 | 4.7 | 5.0 | 4.1 | 5.1 | 6.2 | 6.0 | 6.0 |
| Inner core F concentration | % by mass | 0 | 0.2 | 0.2 | 0.3 | 0.5 | 0.2 | 0.5 | 0.9 | 0.8 | 0.8 |
| Inner core radius | μm | — | 1.6 | 2.8 | 1.4 | 2.0 | 2.2 | 2.4 | 1.0 | 1.4 | 2.2 |
| Inner core rel. refractive index diff. | % | 0.33 | 0.34 | 0.31 | 0.35 | 0.34 | 0.32 | 0.34 | 0.33 | 0.33 | 0.34 |
| Outer core Ge concentration | % by mass | 3.2 | 3.2 | 3.2 | 3.3 | 3.2 | 3.2 | 3.2 | 3.2 | 3.2 | 3.1 |
| Outer core F concentration | % by mass | 0 | 0 | 0 | 0 | 0 | 0 | 0 | 0 | 0 | 0 |
| Outer core radius | μm | 4.3 | 4.5 | 4.5 | 4.1 | 4.4 | 4.4 | 4.5 | 4.4 | 4.6 | 5.0 |
| Outer core rel. refractive index diff. | % | 0.33 | 0.33 | 0.33 | 0.34 | 0.33 | 0.32 | 0.32 | 0.33 | 0.33 | 0.30 |
| Inner core radius/ outer core radius | — | — | 0.36 | 0.62 | 0.34 | 0.46 | 0.50 | 0.53 | 0.22 | 0.30 | 0.44 |
| Rel. Brillouin gain | — | 1 | 0.66 | 0.67 | 0.55 | 0.41 | 0.53 | 0.48 | 0.61 | 0.55 | 0.44 |
| Rel. threshold power Optical characts. (ref./extract) | — | 1 | 1.5 | 1.5 | 1.8 | 2.4 | 1.9 | 2.1 | 1.6 | 1.8 | 2.3 |
| Transmission loss @1310 nm | dB/km | 0.332 | 0.328 | 0.327 | 0.331 | 0.331 | 0.333 | 0.322 | 0.327 | 0.331 | 0.329 |
| MFD @1310 nm | μm | 9.45 | 9.28 | 9.43 | 9.21 | 9.41 | 9.43 | 9.52 | 9.40 | 9.44 | 9.65 |
| Zero-dispersion wavelength | nm | 1312 | 1316 | 1309 | 1315 | 1309 | 1310 | 1308 | 1307 | 1312 | 1302 |
| Cable cut-off wavelength | μm | 1.24 | 1.22 | 1.26 | 1.25 | 1.23 | 1.23 | 1.24 | 1.21 | 1.23 | 1.26 |

TABLE 2

| | Unit | 11 Ex. | 12 Ex. | 13 Ex. | 14 Ex. | 15 Ex. | 16 Ex. | 17 Ex. | 18 Ex. | 19 Ex. | 20 Ex. |
|---|---|---|---|---|---|---|---|---|---|---|---|
| Inner core Ge concentration | % by mass | 6.7 | 7.2 | 8.3 | 9.2 | 8.6 | 8.3 | 10.3 | 10.0 | 9.9 | 12.0 |
| Inner core F concentration | % by mass | 1.0 | 1.2 | 1.5 | 1.7 | 1.7 | 1.5 | 2.2 | 2.0 | 2.0 | 2.6 |
| Inner core radius | μm | 2.9 | 2.2 | 3.1 | 1.6 | 2.2 | 1.0 | 1.6 | 3.3 | 2.5 | 1.0 |
| Inner core rel. refractive index diff. | % | 0.34 | 0.33 | 0.33 | 0.36 | 0.31 | 0.34 | 0.31 | 0.35 | 0.33 | 0.34 |
| Outer core Ge concentration | % by mass | 3.4 | 3.2 | 3.3 | 3.3 | 3.3 | 3.3 | 3.3 | 3.3 | 3.3 | 3.3 |
| Outer Core F concentration | % by mass | 0 | 0 | 0 | 0 | 0 | 0 | 0 | 0 | 0 | 0 |
| Outer core radius | μm | 4.1 | 4.5 | 4.4 | 4.4 | 4.5 | 4.3 | 4.4 | 4.5 | 4.4 | 4.3 |
| Outer core rel. refractive index diff. | % | 0.35 | 0.33 | 0.34 | 0.33 | 0.33 | 0.33 | 0.34 | 0.33 | 0.33 | 0.34 |
| Inner core radius/ outer core radius | — | 0.71 | 0.49 | 0.70 | 0.36 | 0.49 | 0.23 | 0.36 | 0.73 | 0.56 | 0.23 |
| Rel. Brillouin gain | — | 0.64 | 0.35 | 0.53 | 0.42 | 0.37 | 0.51 | 0.44 | 0.50 | 0.47 | 0.47 |
| Rel. threshold power Optical characts. (ref./extract) | — | 1.6 | 2.9 | 1.9 | 2.4 | 2.7 | 2.0 | 2.3 | 2.0 | 2.1 | 2.1 |
| Transmission loss @1310 nm | dB/km | 0.333 | 0.335 | 0.336 | 0.337 | 0333 | 0.326 | 0.336 | 0.345 | 0.342 | 0.355 |
| MFD @1310 nm | μm | 9.09 | 9.41 | 9.43 | 9.35 | 9.42 | 9.33 | 9.42 | 9.28 | 9.43 | 9.41 |

TABLE 2-continued

|  | Unit | 11 Ex. | 12 Ex. | 13 Ex. | 14 Ex. | 15 Ex. | 16 Ex. | 17 Ex. | 18 Ex. | 19 Ex. | 20 Ex. |
|---|---|---|---|---|---|---|---|---|---|---|---|
| Zero-dispersion wavelength | nm | 1316 | 1310 | 1307 | 1312 | 1305 | 1311 | 1306 | 1314 | 1310 | 1308 |
| Cable cut-off wavelength | μm | 1.25 | 1.23 | 1.25 | 1.23 | 1.25 | 1.21 | 1.23 | 1.18 | 1.22 | 1.23 |

TABLE 3

|  | Unit | 21 Example | 22 Example | 23 Example | 24 Example | 25 Example |
|---|---|---|---|---|---|---|
| Inner core Ge concentration | % by mass | 13.2 | 6.5 | 7.3 | 8.4 | 7.7 |
| Inner core F concentration | % by mass | 3.2 | 1.0 | 1.1 | 1.5 | 1.4 |
| Inner core radius | μm | 3.0 | 2.1 | 1.8 | 2.4 | 2.1 |
| Inner core rel. refractive index diff. | % | 0.29 | 0.31 | 0.35 | 0.33 | 0.30 |
| Outer core Ge concentration | % by mass | 3.3 | 3.4 | 3.4 | 3.8 | 4.4 |
| Outer core F concentration | % by mass | 0 | 0.01 | 0.05 | 0.13 | 0.3 |
| Outer core radius | μm | 4.5 | 4.4 | 4.5 | 4.3 | 4.4 |
| Outer core rel. refractive index diff. | % | 0.33 | 0.34 | 0.32 | 0.33 | 0.33 |
| Inner core radius/outer core radius | — | 0.67 | 0.48 | 0.40 | 0.56 | 0.48 |
| Rel. Brillouin gain | — | 0.45 | 0.39 | 0.48 | 0.44 | 0.50 |
| Rel. threshold power | — | 2.2 | 2.6 | 2.1 | 2.3 | 2.0 |
| Optical characts. (ref./extract) |  |  |  |  |  |  |
| Transmission loss @1310 nm | dB/km | 0.359 | 0.325 | 0.329 | 0.335 | 0.340 |
| MFD @1310 nm | μm | 9.44 | 9.32 | 9.44 | 9.38 | 9.51 |
| Zero-dispersion wavelength | nm | 1303 | 1311 | 1308 | 1310 | 1301 |
| Cable cut-off wavelength | μm | 1.19 | 1.25 | 1.23 | 1.24 | 1.27 |

The results in Tables 1-3 indicate that the occurrence of SBS were reduced and relatively higher SBS threshold power was obtained in the optical fibers of Examples Nos. 2-25 compared to the typical SM optical fiber of the comparative example, which allowed transmission with higher-power signals than in the typical SM optical fiber of the comparative example. This is because they were configured to have an inner core containing germanium and fluorine and an outer core containing only germanium or germanium and a small amount of fluorine.

Figure 2:
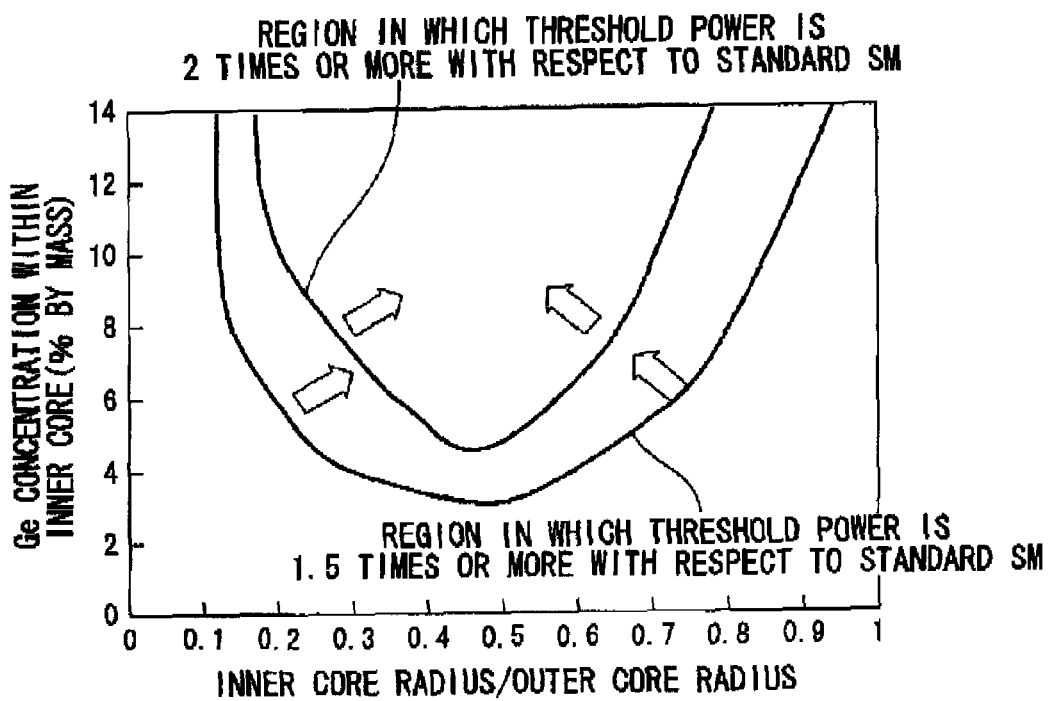
FIG. 2 is a graph showing the relationship among the ratios of inner core radius/outer core radius, the inner core Ge concentrations, and the threshold power of the optical fibers, described herein.

FIG. 2 shows the relationship among the ratios of inner core radius/outer core radius, the inner core Ge concentrations, and the threshold power obtained in the optical fibers prototyped in this embodiment.

FIG. 2 indicates that the desired threshold power was obtained when the above-described parameter range is satisfied.

Second Embodiment

Figure 4A:
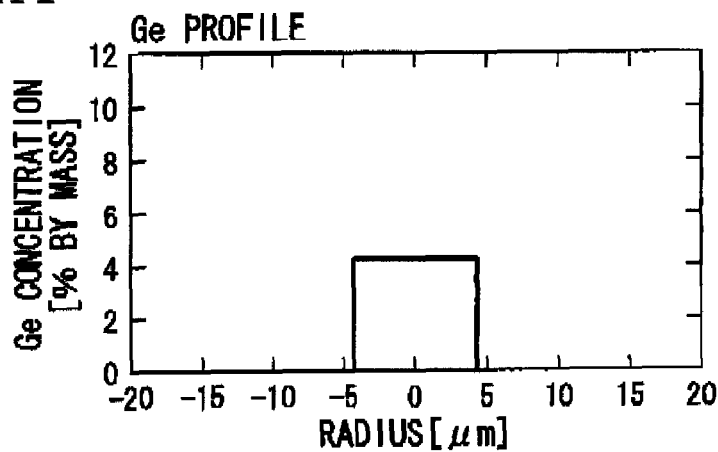
FIG. 4A is graph showing the Ge concentration profile of an optical fiber according to conventional techniques in a second embodiment.
Figure 4B:
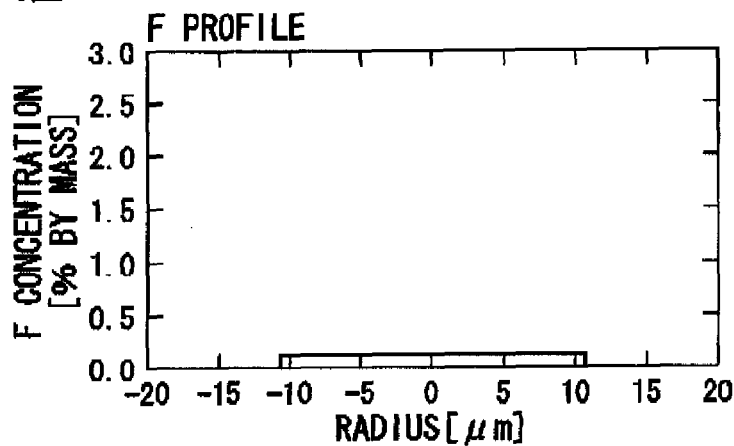
FIG. 4B is graph showing the F concentration profile of the optical fiber according to the conventional techniques in the second embodiment.
Figure 4C:
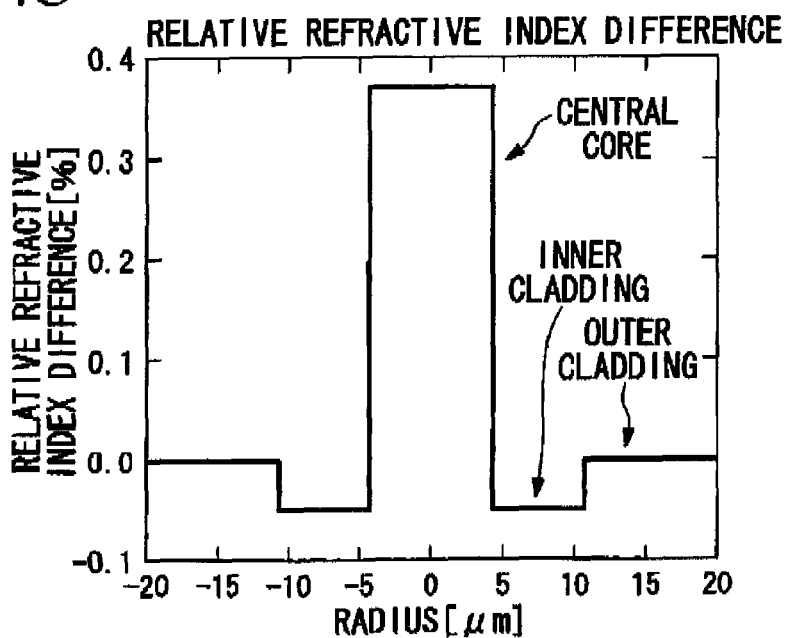
FIG. 4C is graph showing the refractive index difference profile of the optical fiber according to the conventional techniques in the second embodiment.

A second embodiment is related to an SM optical fiber that has a mode field diameter (MFD) at a wavelength of 1310 nm of about 8.6 μm. Such optical fibers have been commercialized as optical fibers that reduce bending loss in the range satisfying ITU-T Recommendation G.652. The concentration profiles of dopants (Ge and F) and the relative refractive index difference of such an optical fiber that is designed using conventional techniques are shown in FIGS. 4A-C and Table 4.

TABLE 4

|  | radius [μm] | Ge concentration [% by mass] | F concentration [% by mass] | Relative refractive index diff. [%] |
|---|---|---|---|---|
| Central core | 4.256 | 4.21 | 0.15 | 0.37 |
| Inner cladding | 10.64 | 0.00 | 0.15 | −0.05 |
| Outer cladding | 62.5 | 0.00 | 0.00 | 0.00 |

Such a refractive index profile can provide optical fibers having optical characteristics described below:

Fiber cut-off: 1.26 μm.

MFD at a wavelength of 1310 nm: 8.59 μm.

MFD at a wavelength of 1550 nm: 9.56 μm.

Zero-dispersion wavelength: 1305.8 nm.

Chromatic dispersion at a wavelength of 1550 nm: 17.1 ps/nm/km.

Dispersion slope at a wavelength of 1550 nm: 0.057 ps/nm$^2$/km.

Bending loss at a bending diameter of 30 mm at a wavelength of 1310 nm: <0.01 dB/m.

Bending loss at a bending diameter of 30 mm at a wavelength of 1550 nm: $1.89 \times 10^{-2}$ dB/m.

The optical fiber based on the refractive index profile shown in FIGS. 4A-C improved the bending loss by having an MFD smaller than those of the typical SM optical fiber shown as Example 1 or the comparative example. However, reduction in the MFD may be problematic since it may deteriorate the SBS threshold power.

Figure 5:
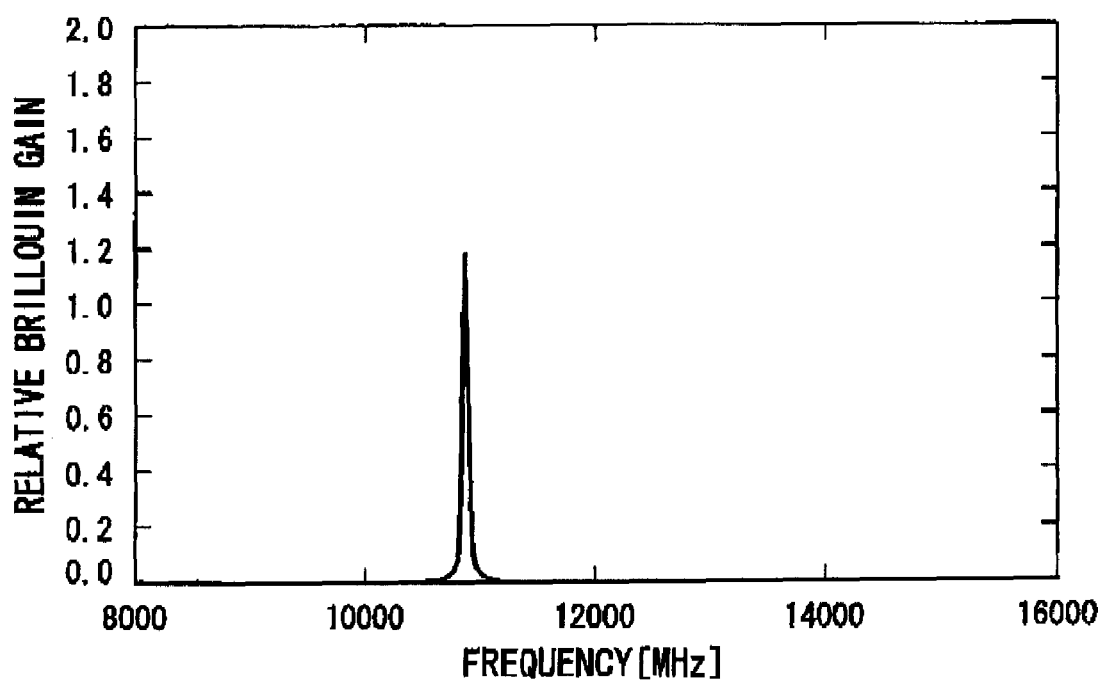
FIG. 5 is a graph showing the relative Brillouin gain spectrum of the optical fiber shown in FIGS. 4A-C.

FIG. 5 shows the relative Brillouin gain spectrum obtained in the refractive index profile shown in FIGS. 4A-C. The data was standardized by assuming the maximum value of the Brillouin gain of the optical fiber of Example 1, the comparative example, as 1. The maximum relative Brillouin gain became 1.18, and the SBS threshold power became 0.7 dB smaller.

Figure 6A:
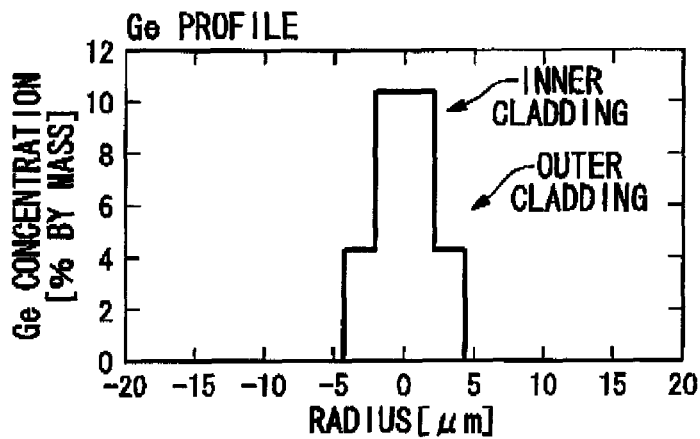
FIG. 6A is graph showing the Ge concentration profile of an optical fiber according to the exemplary technique of the present invention in the second embodiment.
Figure 6B:
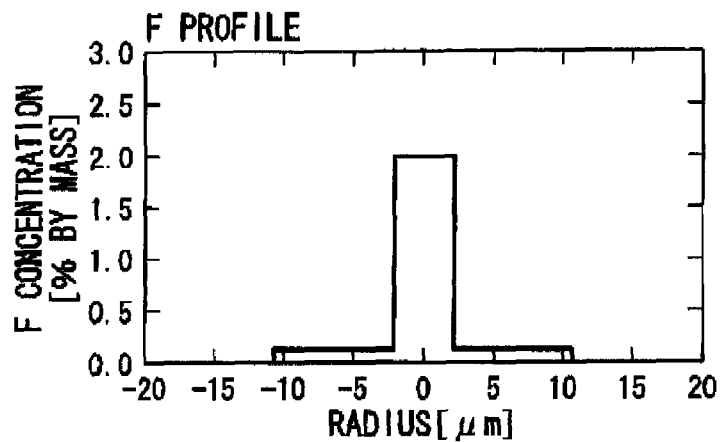
FIG. 6B is graph showing the refractive index profile and the F concentration profile of the optical fiber according to the exemplary technique of the present invention in the second embodiment.
Figure 6C:
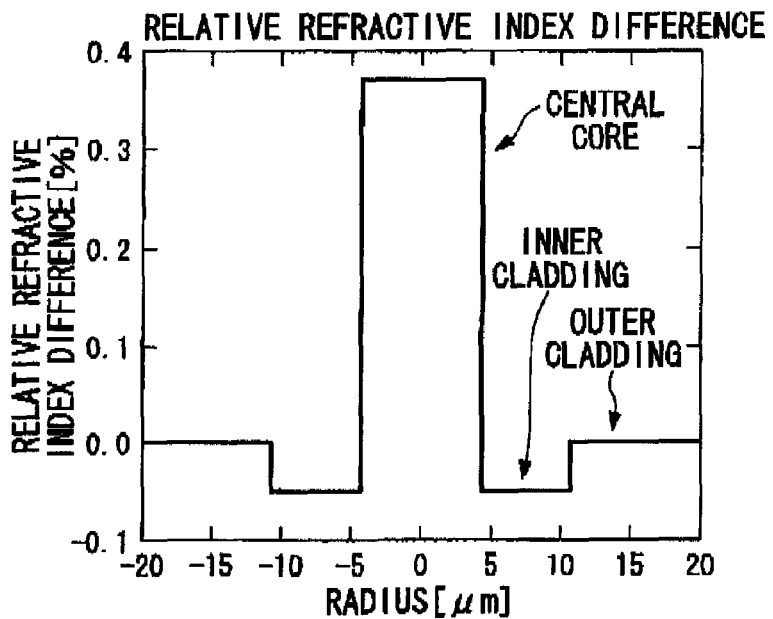
FIG. 6C is graph showing the refractive index difference profile of the optical fiber according to the exemplary technique of the present invention in the second embodiment.

FIGS. 6A-C and Table 5 show Example 26 of the optical fiber based on a second embodiment of the present invention.

TABLE 5

|  | radius [μm] | Ge concentration [% by mass] | F concentration [% by mass) | Relative refractive index diff. [%] |
| --- | --- | --- | --- | --- |
| Inner core | 2.128 | 10.31 | 2.00 | 0.37 |
| Outer core | 4.256 | 4.21 | 0.15 | 0.37 |
| Inner cladding | 10.64 | 0.00 | 0.15 | −0.05 |
| Outer cladding | 62.5 | 0.00 | 0.00 | 0.00 |

Compared to the example based on the conventional techniques, the concentrations of Ge and F in the inner core region were higher. However, the relative refractive index difference Δ remained the same, and optical characteristics, such as the MFD and the chromatic dispersion, were the same as those of the optical fiber with the refractive index profile shown in FIGS. 4A-C.

Figure 7:
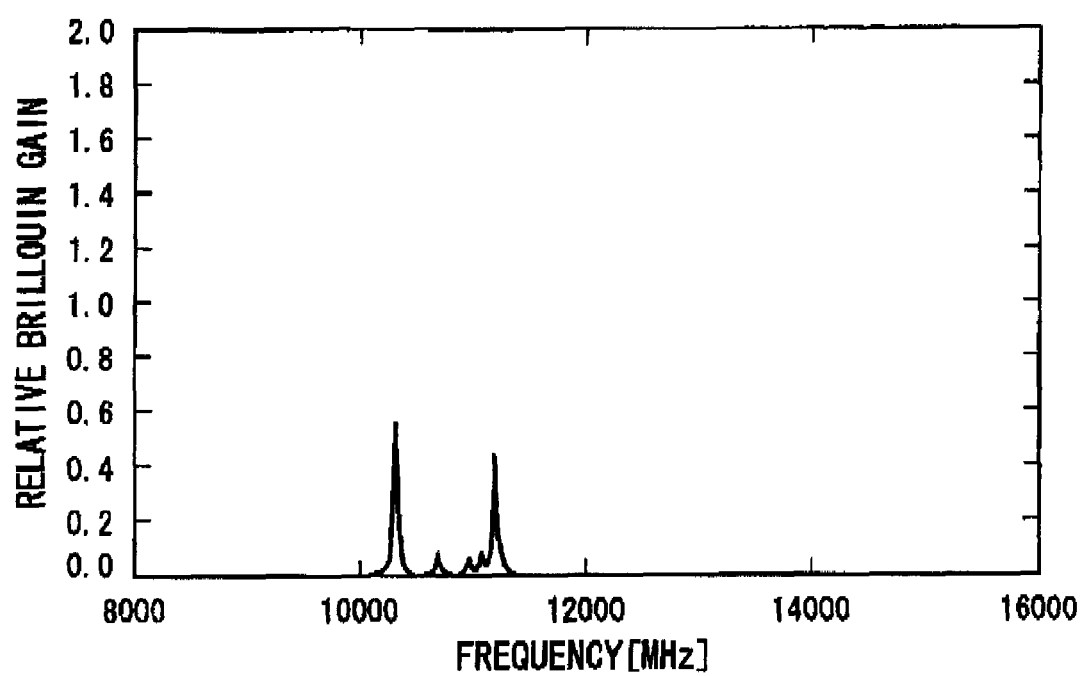
FIG. 7 is a graph showing the relative Brillouin gain spectrum of the optical fiber shown in FIGS. 6A-C.

FIG. 7 shows the relative Brillouin gain spectrum of the optical fiber of the refractive index profile shown in FIGS. 6A-C. Similar to FIG. 5, the optical fiber of Example 1 or the comparative example was taken as a reference. The maximum relative Brillouin gain became 0.55, and the SBS threshold power was 2.6 dB improved.

In addition to exhibiting optical characteristics satisfying ITU-T Recommendation G.652, the optical fiber of this embodiment is an optical fiber with a low bending loss and a high SBS threshold power, and has excellent characteristics as an optical fiber for FTTH.

Third Embodiment

A third embodiment is related to optical fiber having a further improved bending characteristic.

Figure 8A:
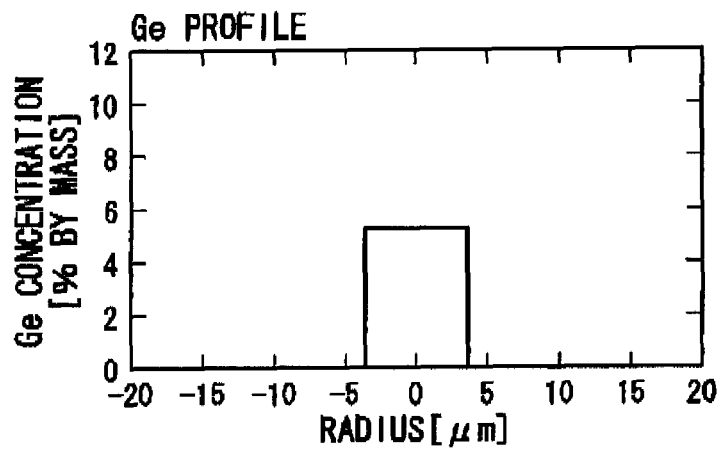
FIG. 8A is graph showing the Ge concentration profile of an optical fiber according to conventional techniques in a third embodiment.
Figure 8B:
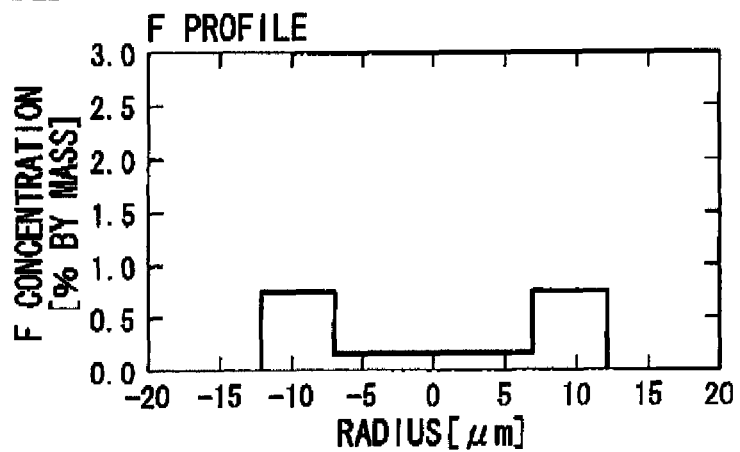
FIG. 8B is graph showing the F concentration profile of the optical fiber according to the conventional techniques in the third embodiment.
Figure 8C:
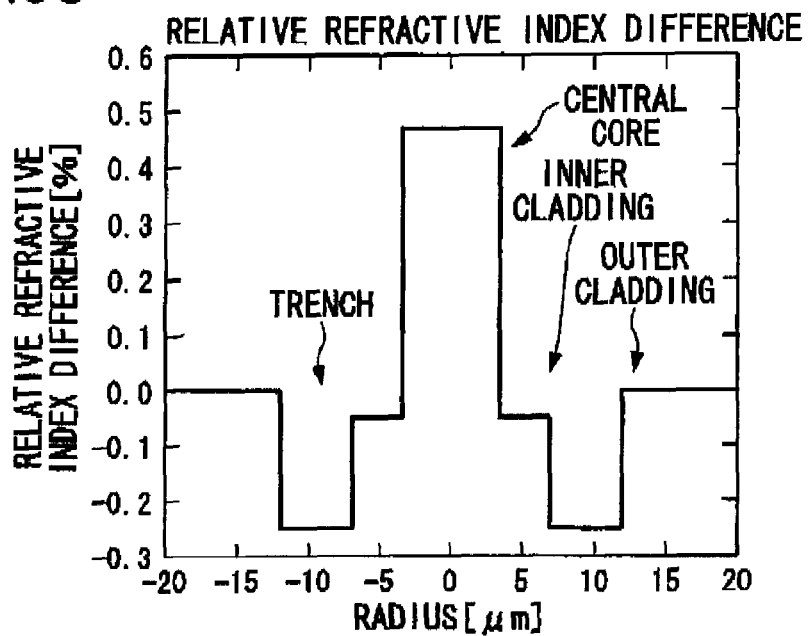
FIG. 8C is graph showing the refractive index difference profile of the optical fiber according to the conventional techniques in the third embodiment.

FIGS. 8A-C show an example of a low-bending-loss optical fiber based on the conventional techniques. This optical fiber has the concentration profiles and refractive index profile shown in Table 6.

TABLE 6

|  | radius [μm] | Ge concentration [% by mass] | F concentration [% by mass] | Relative refractive index diff. [%] |
| --- | --- | --- | --- | --- |
| Central core | 3.47 | 5.21 | 0.15 | 0.47 |
| Inner cladding | 6.94 | 0.00 | 0.15 | −0.05 |
| Trench | 12.15 | 0.00 | 0.76 | −0.25 |
| Outer cladding | 62.50 | 0.00 | 0.00 | 0.00 |

Such a refractive index profile can provide optical fibers having optical characteristics described below:

Fiber cut-off: 1.26 μm.

MFD at a wavelength of 1310 nm: 7.36 μm.

MFD at a wavelength of 1550 nm: 8.19 μm.

Zero-dispersion wavelength: 1319.2 nm.

Chromatic dispersion at a wavelength of 1550 nm: 17.4 ps/nm/km.

Dispersion slope at a wavelength of 1550 nm: 0.060 ps/nm²/km.

Bending loss at a bending diameter of 30 mm at a wavelength of 1310 nm: <0.01 dB/m.

Bending loss at a bending diameter of 30 mm at a wavelength of 1550 nm: <0.01 dB/m.

Bending loss at a bending diameter of 15 mm at a wavelength of 1310 nm: <0.01 dB/m.

Bending loss at a bending diameter of 15 mm at a wavelength of 1550 nm: <0.29 dB/m.

Figure 9:
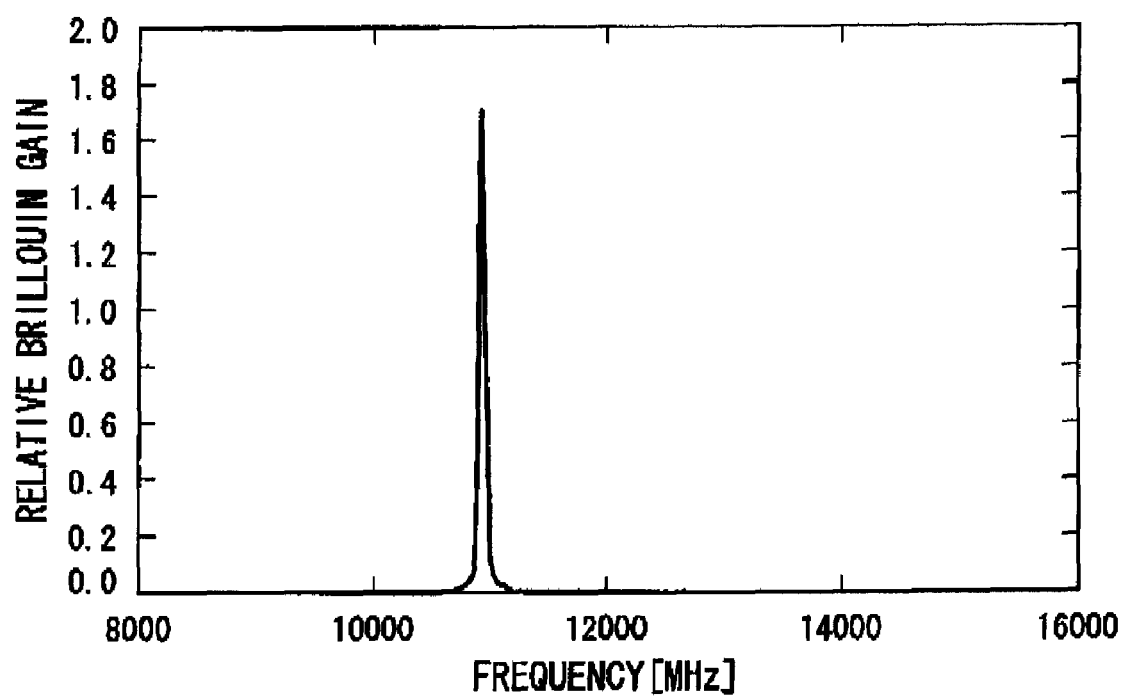
FIG. 9 is a graph showing the relative Brillouin gain spectrum of the optical fiber shown in FIGS. 8A-C.

Although the MFD at a wavelength of 1310 nm was 7.36 μm, which was somewhat small, the bending loss was improved with almost no increase in loss even when wound in a diameter of 15 mm. However, reduction in the MFD deteriorates the SBS threshold power. FIG. 9 shows the relative Brillouin gain spectrum of optical fiber of this example. Similar to FIG. 5, Example 1 or the comparative example was taken as a reference. The maximum relative Brillouin gain became 1.7, and the SBS threshold power became 2.3 dB smaller.

Figure 10A:
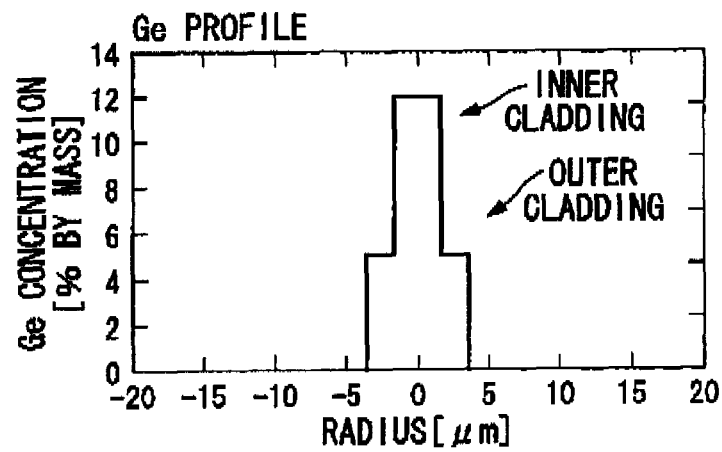
FIG. 10A is graph showing the Ge concentration profile of an optical fiber according to the exemplary technique of the present invention in the third embodiment.
Figure 10B:
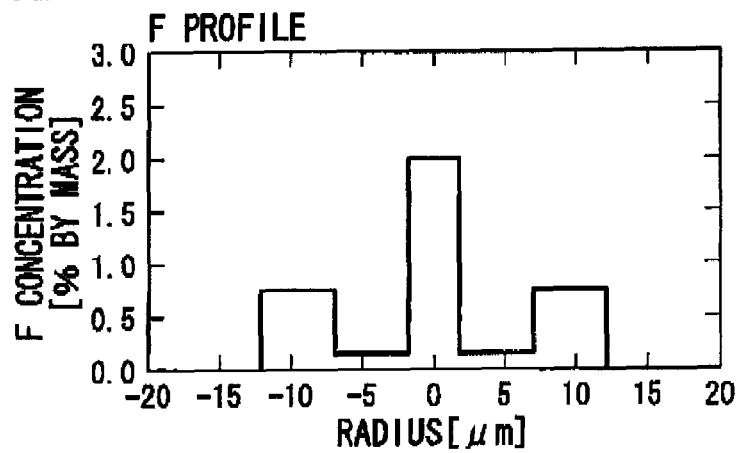
FIG. 10B is graph showing the F concentration profile of an optical fiber according to the exemplary technique of the present invention in the third embodiment.
Figure 10C:
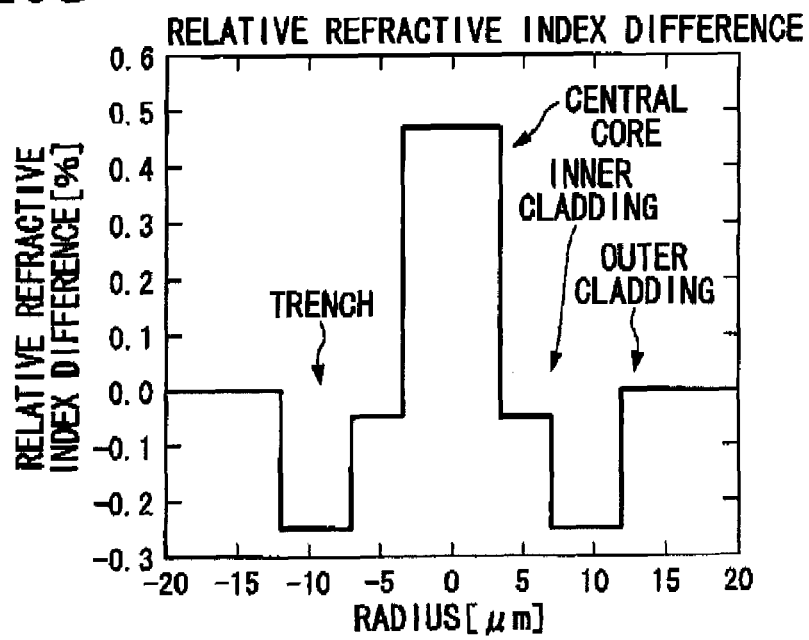
FIG. 10C is graph showing the refractive index difference profile of the optical fiber according to the exemplary technique of the present invention in the third embodiment.

FIGS. 10A-C and Table 7 show Example 27 of the optical fiber based on a third embodiment of the present invention.

TABLE 7

|  | radius [μm] | Ge concentration [% by mass] | F concentration [% by mass] | Relative refractive index diff. [%] |
| --- | --- | --- | --- | --- |
| Inner core | 1.74 | 11.32 | 2.00 | 0.47 |
| Outer core | 3.47 | 5.21 | 0.15 | 0.47 |
| Inner cladding | 6.94 | 0.00 | 0.15 | −0.05 |
| Trench | 12.15 | 0.00 | 0.76 | −0.25 |
| Outer cladding | 62.50 | 0.00 | 0.00 | 0.00 |

Although the Ge and F concentrations were higher in the inner core than the example based on the conventional techniques, the relative refractive index difference Δ was the same and optical characteristic, such as the MFD and the chromatic dispersion, became the same as those of the refractive index profile shown in FIGS. 8A-C.

Figure 11:
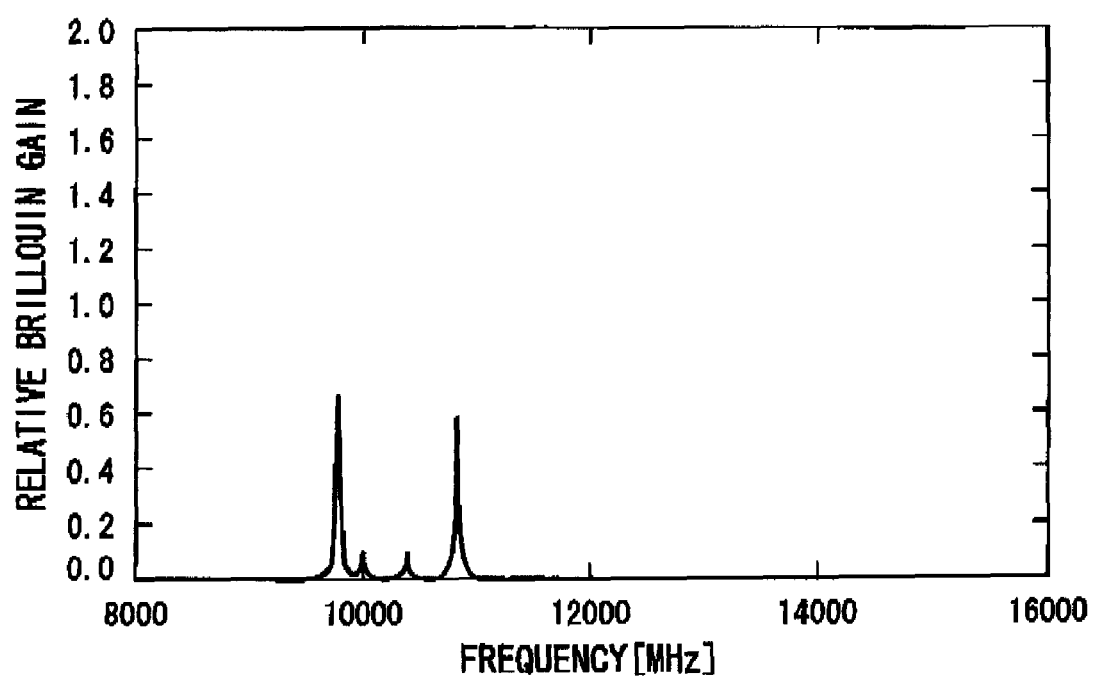
FIG. 11 is a graph showing the relative Brillouin gain spectrum of the optical fiber shown in FIGS. 10A-C.

FIG. 11 shows the relative Brillouin gain spectrum of the optical fiber of the refractive index profile shown in FIGS. 10A-C. Similar to FIG. 5, Example 1 or the comparative example was taken as a reference. The maximum relative Brillouin gain became 0.67, and the SBS threshold power was 1.7 dB improved.

In addition to exhibiting optical characteristics comparative to ITU-T Recommendation G.652, the optical fiber of this embodiment is an optical fiber with a low bending loss and a high SBS threshold power, and has excellent characteristics as an optical fiber for FTTH.

Fourth Embodiment

Figure 12A:
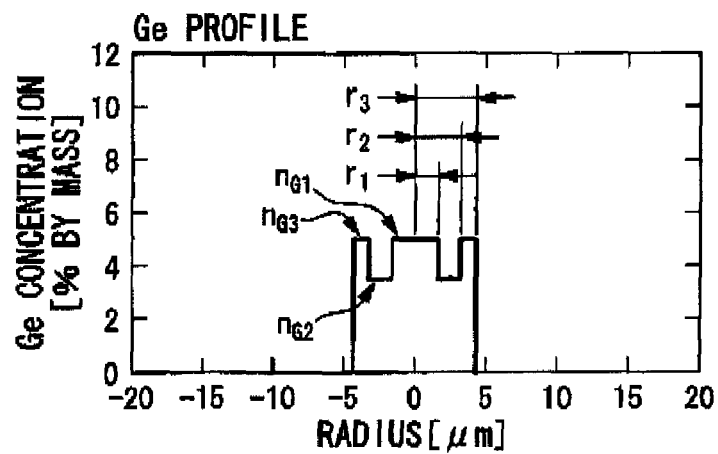
FIG. 12A is graph showing the Ge concentration profile of an optical fiber according to the exemplary technique of the present invention in a forth embodiment.
Figure 12B:
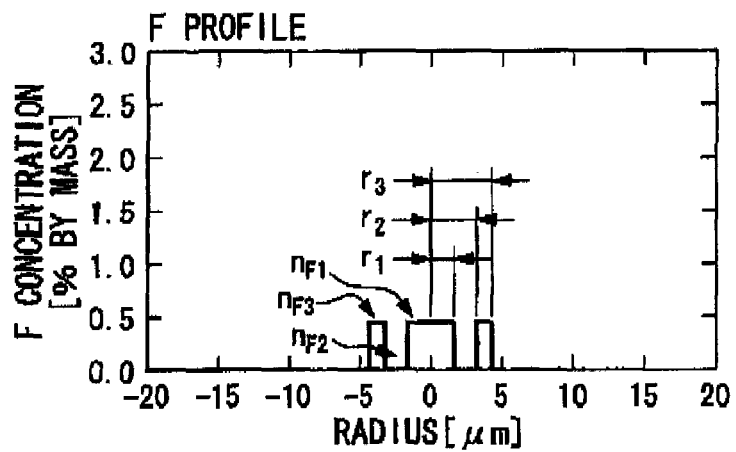
FIG. 12B is graph showing the F concentration profile of an optical fiber according to the exemplary technique of the present invention in the forth embodiment.
Figure 12C:
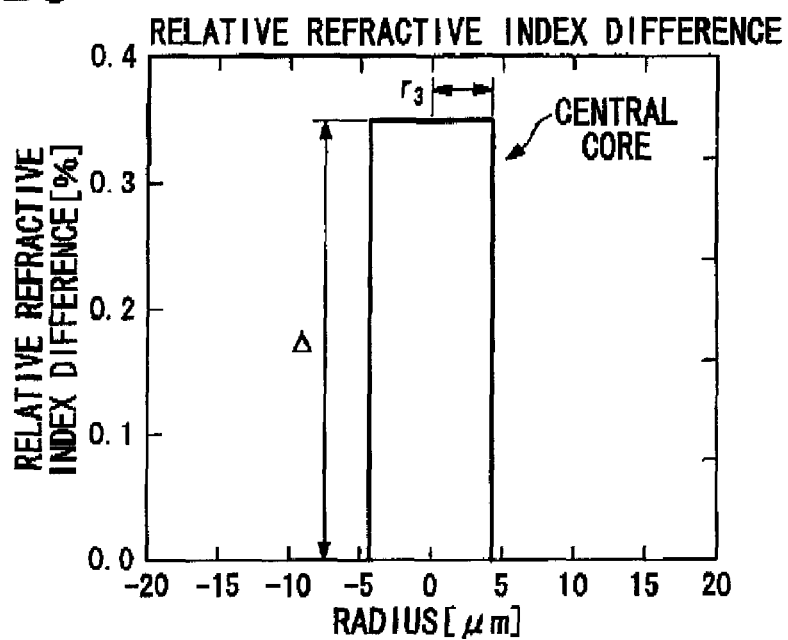
FIG. 12C is graph showing the refractive index difference profile of the optical fiber according to the exemplary technique of the present invention in the forth embodiment.

A forth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 12A-C. The radii, optical relative refractive index difference, and the Ge and F concentrations in each layer are shown below:

First layer radius ($r_1$): 1.66 μm.

Second layer radius ($r_2$): 3.33 μm.

Third layer radius ($r_3$): 4.43 μm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 5.0% by mass. Third layer F concentration ($n_{F3}$): 0.45% by mass.

Relative refractive index difference (Δ): 0.35%.

The Ge concentrations and the F concentrations of the first layer, the second layer, and the third layer were adjusted such that the respective relative refractive index differences Δ all became 0.35%.

Such a refractive index profile can provide optical fibers having optical characteristics described below:

Fiber cut-off: 1292 mm.

Cable cut-off: 1240 nm.

MFD at a wavelength of 1310 nm: 9.21 μm.

MFD at a wavelength of 1550 nm: 10.30 μm.

Zero-dispersion wavelength: 1307.2 nm.

Chromatic dispersion at a wavelength of 1550 nm: 17.38 ps/nm/km.

Dispersion slope at a wavelength of 1550 nm: 0.060 ps/nm$^2$/km.

Bending loss at a bending diameter of 30 mm at a wavelength of 1310 nm: 0.13 dB/m.

Bending loss at a bending diameter of 30 mm at a wavelength of 1550 nm: 3.73 dB/m.

The optical fiber of this embodiment has a substantially comparative MFD to that of the typical optical fiber shown as Example 1, the comparative example.

Figure 13:
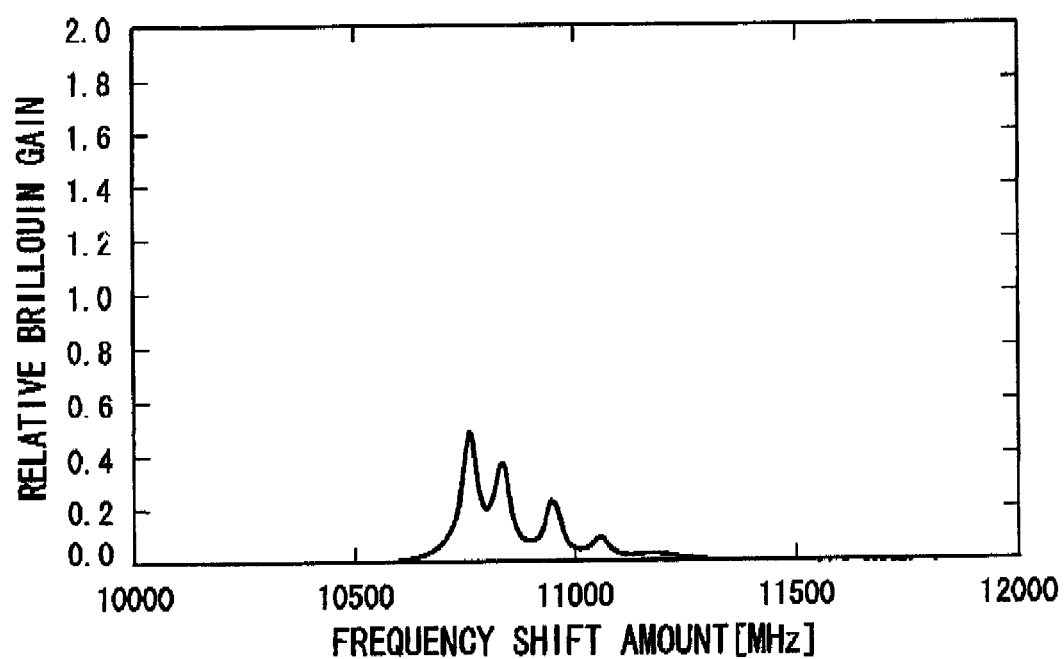
FIG. 13 is a graph showing the relative Brillouin gain spectrum of the optical fiber shown in FIGS. 12A-C.

FIG. 13 shows the relative Brillouin gain spectrum of the optical fiber obtained in the refractive index profile shown in FIGS. 12A-C. The data was standardized by assuming the maximum value of the Brillouin gain of the optical fiber of Example 1, the comparative example, as 1. The maximum relative Brillouin gain became 0.46, and the SBS threshold power became 4.3 dB smaller.

In this embodiment, there were peaks with relative gains of 0.46, 0.32, 0.20, 0.07, and 0.02 at the frequency shifts of 10760 MHz, 10840 MHz, 10950 MHz, 11060 MHz, and 11180 MHz, respectively, in ascending order.

Fifth Embodiment

Figure 14A:
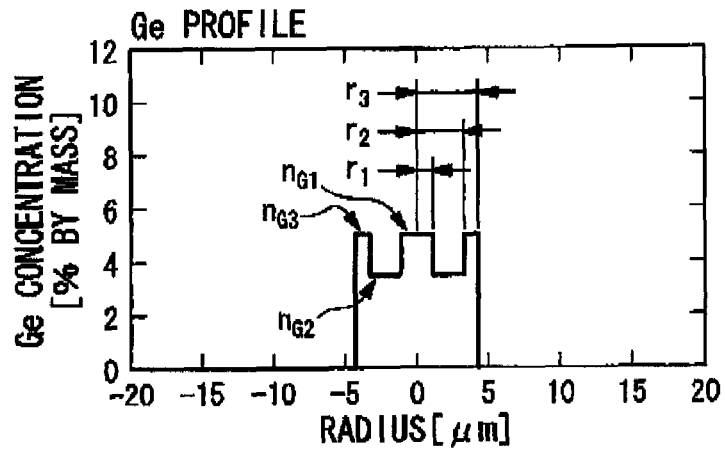
FIG. 14A is graph showing the Ge concentration profile of an optical fiber according to the exemplary technique of the present invention in a fifth embodiment.
Figure 14B:
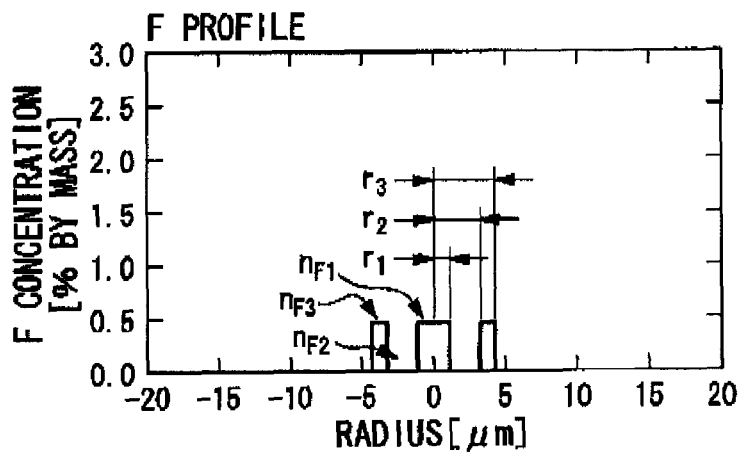
FIG. 14B is graph showing the F concentration profile of an optical fiber according to the exemplary technique of the present invention in the fifth embodiment.
Figure 14C:
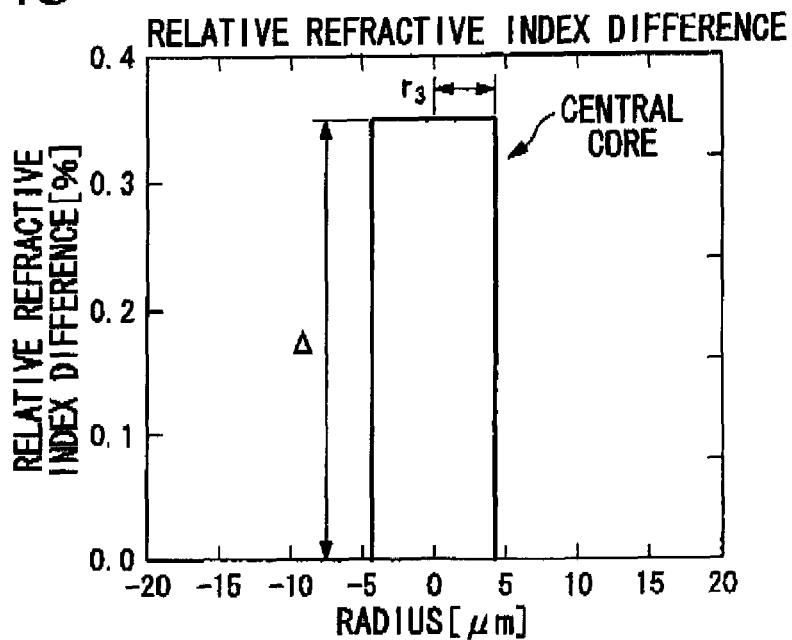
FIG. 14C is graph showing the refractive index difference profile of the optical fiber according to the exemplary technique of the present invention in the fifth embodiment.

A fifth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 14A-C. The radii, optical relative refractive index difference, and the Ge and F concentrations in each layer are shown below:

First layer radius ($r_1$): 1.11 μm.

Second layer radius ($r_2$): 3.33 μm.

Third layer radius ($r_3$): 4.43 μm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 5.0% by mass. Third layer F concentration ($n_{F3}$): 0.45% by mass.

Relative refractive index difference (Δ): 0.35%.

The Ge concentrations and the F concentrations of the first layer, the second layer, and the third layer were adjusted such that the respective relative refractive index differences Δ all became 0.35%. Thus, the optical characteristics obtained were the same those of the fourth embodiment.

Figure 15:
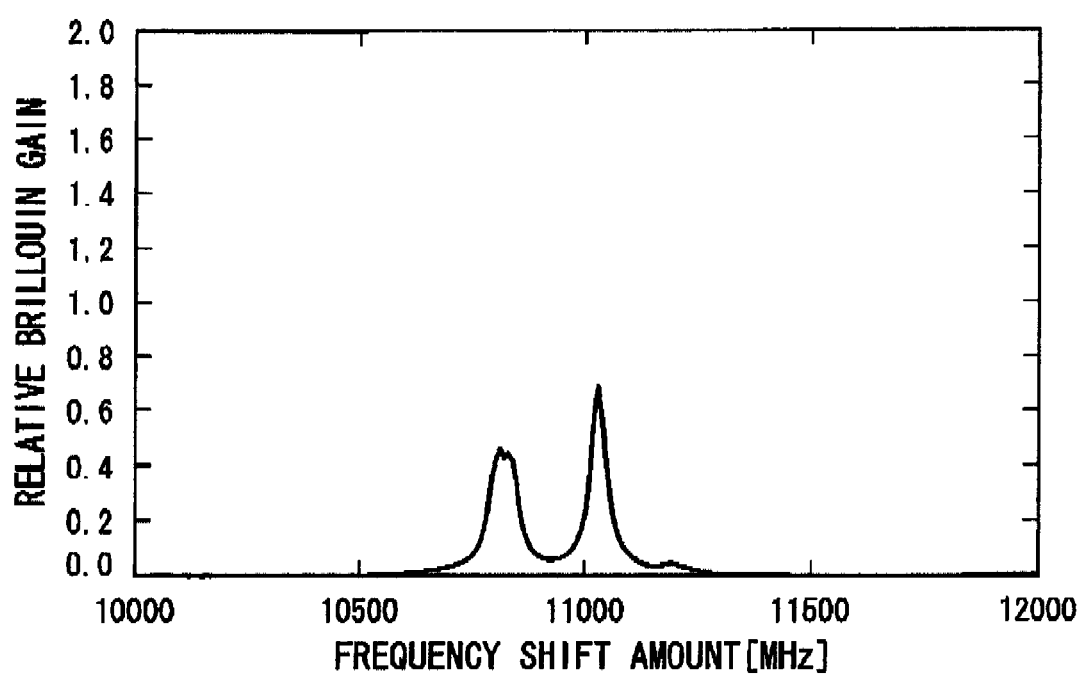
FIG. 15 is a graph showing the relative Brillouin gain spectrum of the optical fiber shown in FIGS. 14A-C.

FIG. 15 shows the relative Brillouin gain spectrum of the optical fiber obtained in the refractive index profile shown in FIGS. 14A-C. The data was standardized by assuming the maximum value of the Brillouin gain of the optical fiber of Example 1, the comparative example, as 1. The maximum relative Brillouin gain became 0.67, and the SBS threshold power became 2.4 dB smaller.

In this embodiment, there were peaks with relative gains of 0.45, 0.44, 0.67, and 0.02 at the frequency shifts of 10800 MHz, 10840 MHz, 11030 MHz, and 11200 MHz, respectively, in ascending order.

Sixth Embodiment

Figure 16A:
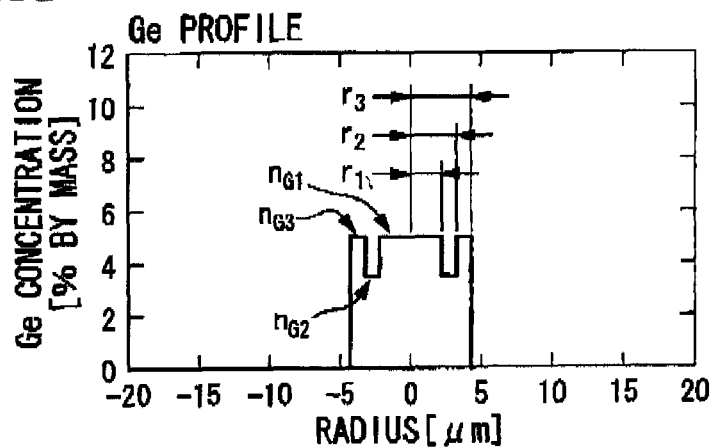
FIG. 16A is graph showing the Ge concentration profile of an optical fiber according to the exemplary technique of the present invention in a sixth embodiment.
Figure 16B:
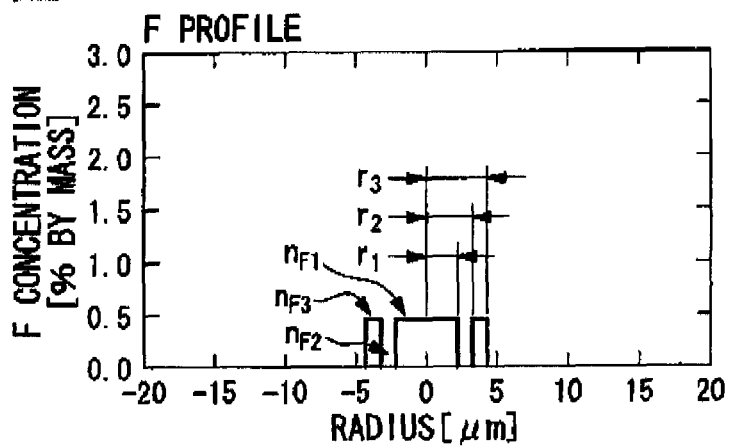
FIG. 16B is graph showing the F concentration profile of an optical fiber according to the exemplary technique of the present invention in the sixth embodiment.
Figure 16C:
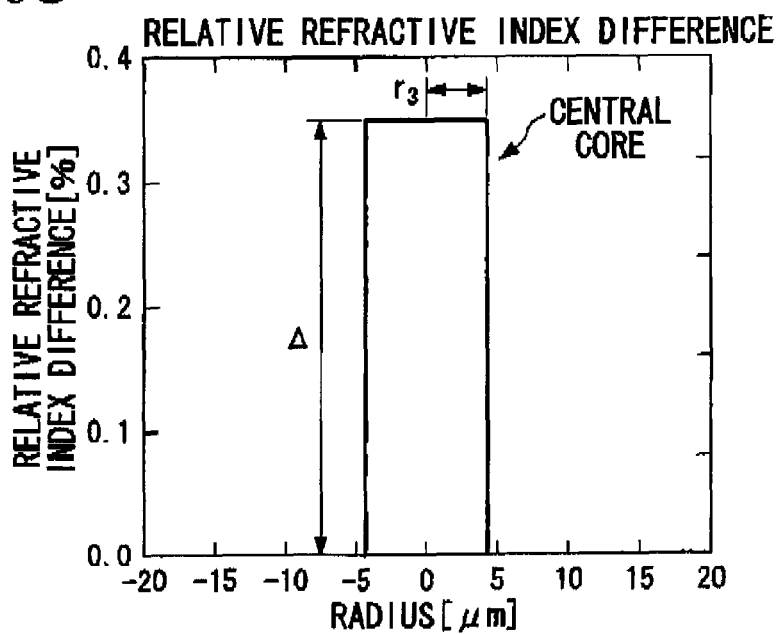
FIG. 16C is graph showing the refractive index difference profile of the optical fiber according to the exemplary technique of the present invention in the sixth embodiment.

A sixth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 16A-C. The radii, optical relative refractive index difference, and the Ge and F concentrations in each layer are shown below:

First layer radius ($r_1$): 2.22 μm.

Second layer radius ($r_2$): 3.33 μm.

Third layer radius ($r_3$): 4.43 μm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 5.0% by mass. Third layer F concentration ($n_{F3}$): 0.45% by mass.

Relative refractive index difference (Δ): 0.35%.

The Ge concentrations and the F concentrations of the first layer, the second layer, and the third layer were adjusted such that the respective relative refractive index differences Δ all became 0.35%. Thus, the optical characteristics obtained were the same those of the fourth embodiment.

Figure 17:
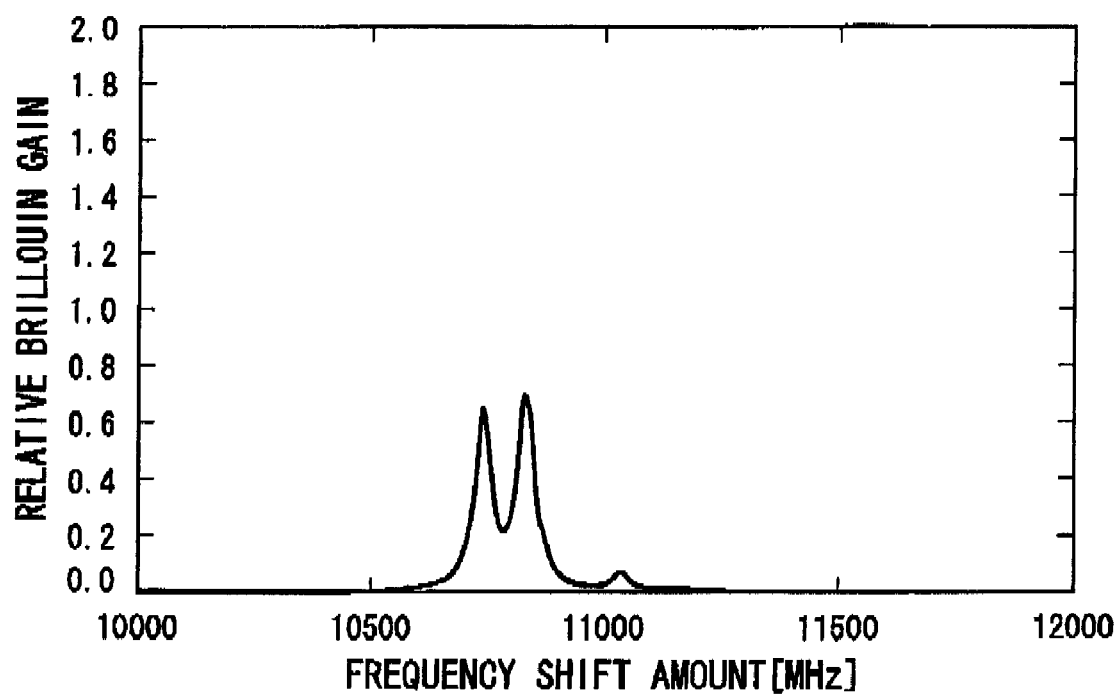
FIG. 17 is a graph showing the relative Brillouin gain spectrum of the optical fiber shown in FIGS. 16A-C.

FIG. 17 shows the relative Brillouin gain spectrum of the optical fiber obtained in the refractive index profile shown in FIGS. 16A-C. The data was standardized by assuming the maximum value of the Brillouin gain of the optical fiber of Example 1, the comparative example, as 1. The maximum relative Brillouin gain became 0.66, and the SBS threshold power became 2.9 dB smaller.

In this embodiment, there were peaks with relative gains of 0.62, 0.66, and 0.07 at the frequency shifts of 10740 MHz, 10830 MHz, and 11050 MHz, respectively, in ascending order.

Seventh Embodiment

Figure 18A:
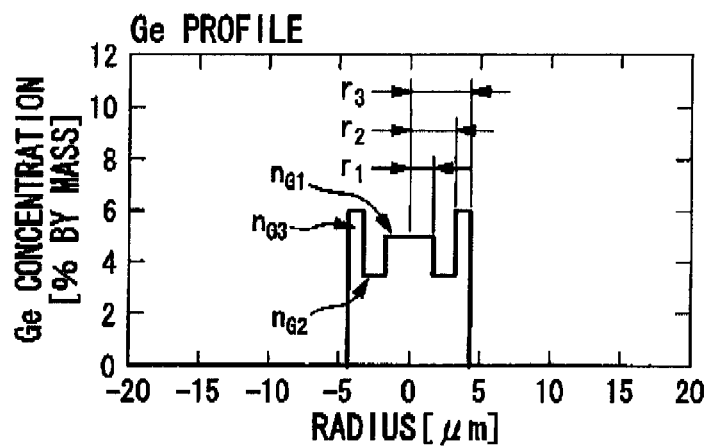
FIG. 18A is graph showing the Ge concentration profile of an optical fiber according to the exemplary technique of the present invention in a seventh embodiment.
Figure 18B:
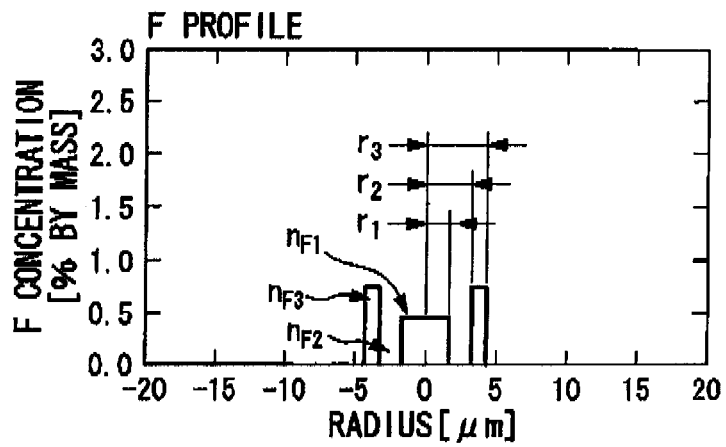
FIG. 18B is graph showing the F concentration profile of an optical fiber according to the exemplary technique of the present invention in the seventh embodiment.
Figure 18C:
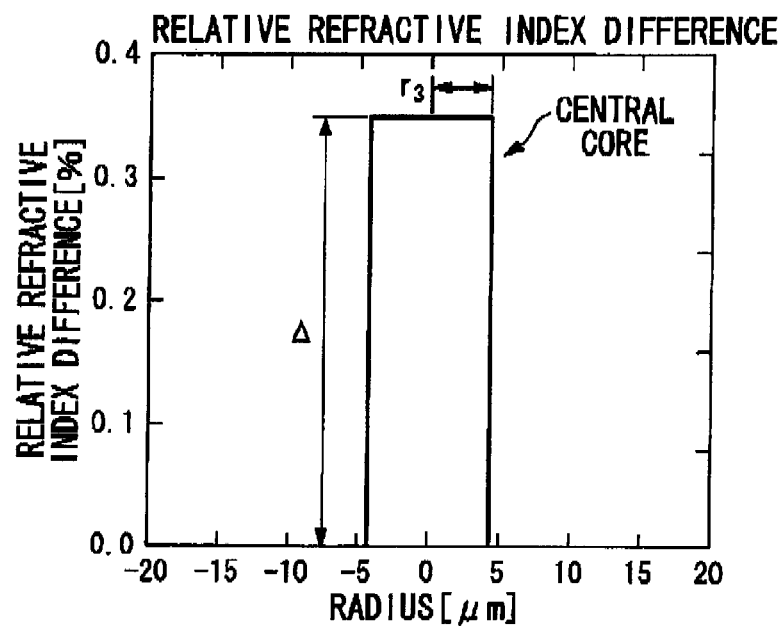
FIG. 18C is graph showing the refractive index difference profile of the optical fiber according to the exemplary technique of the present invention in the seventh embodiment.

A seventh embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 18A-C. The radii, optical relative refractive index difference, and the Ge and F concentrations in each layer are shown below:

First layer radius ($r_1$): 1.66 µm.

Second layer radius ($r_2$): 3.33 µm.

Third layer radius ($r_3$): 4.43 µm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 5.0% by mass. Third layer F concentration ($n_{F3}$): 0.45% by mass.

Relative refractive index difference ($\Delta$): 0.35%.

The Ge concentrations and the F concentrations of the first layer, the second layer, and the third layer were adjusted such that the respective relative refractive index differences $\Delta$ all became 0.35%. Thus, the optical characteristics obtained were the same those of the fourth embodiment.

Figure 19:
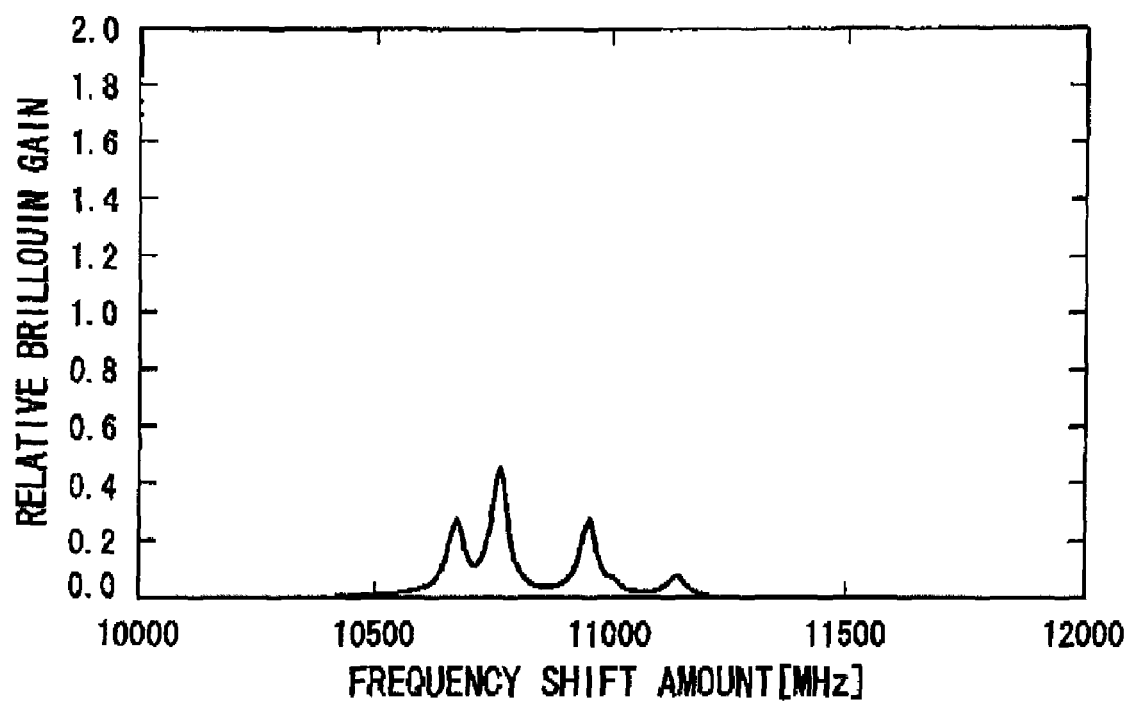
FIG. 19 is a graph showing the relative Brillouin gain spectrum of the optical fiber shown in FIGS. 18A-C.

FIG. 19 shows the relative Brillouin gain spectrum of the optical fiber obtained in the refractive index profile shown in FIGS. 18A-C. The data was standardized by assuming the maximum value of the Brillouin gain of the optical fiber of Example 1, the comparative example, as 1. The maximum relative Brillouin gain became 0.44, and the SBS threshold power became 3.9 dB smaller.

In this embodiment, there were peaks with relative gains of 0.25, 0.44, 0.26, 0.03, and 0.07 at the frequency shifts of 10670 MHz, 10760 MHz, 11950 MHz, 11000 MHz, and 11140 MHz, respectively, in ascending order.

Eighth Embodiment

Figure 20A:
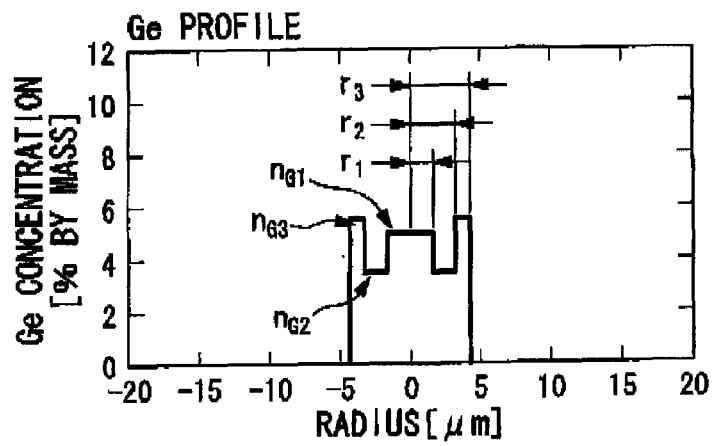
FIG. 20A is graph showing the Ge concentration profile of an optical fiber according to the exemplary technique of the present invention in an eighth embodiment.
Figure 20B:
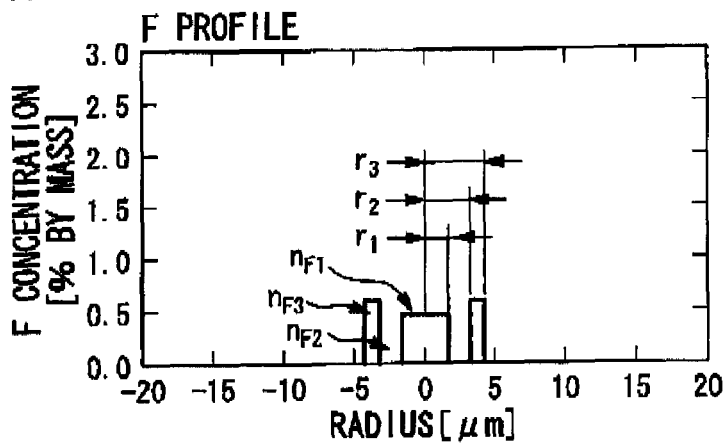
FIG. 20B is graph showing the F concentration profile of an optical fiber according to the exemplary technique of the present invention in the eighth embodiment.
Figure 20C:
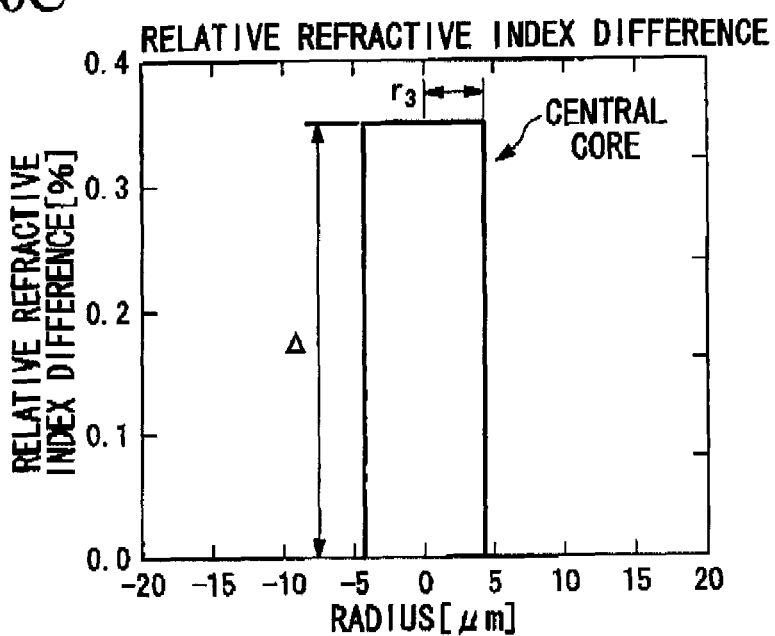
FIG. 20C is graph showing the refractive index difference profile of the optical fiber according to the exemplary technique of the present invention in the eighth embodiment.

An eighth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 20A-C. The radii, optical relative refractive index difference, and the Ge and F concentrations in each layer are shown below:

First layer radius ($r_1$): 1.66 µm.

Second layer radius ($r_2$): 3.33 µm.

Third layer radius ($r_3$): 4.43 µm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 5.5% by mass. Third layer F concentration ($n_{F3}$): 0.60% by mass.

Relative refractive index difference ($\Delta$): 0.35%.

The Ge concentrations and the F concentrations of the first layer, the second layer, and the third layer were adjusted such that the respective relative refractive index differences $\Delta$ all became 0.35%. Thus, the optical characteristics obtained were the same those of the fourth embodiment.

Figure 21:
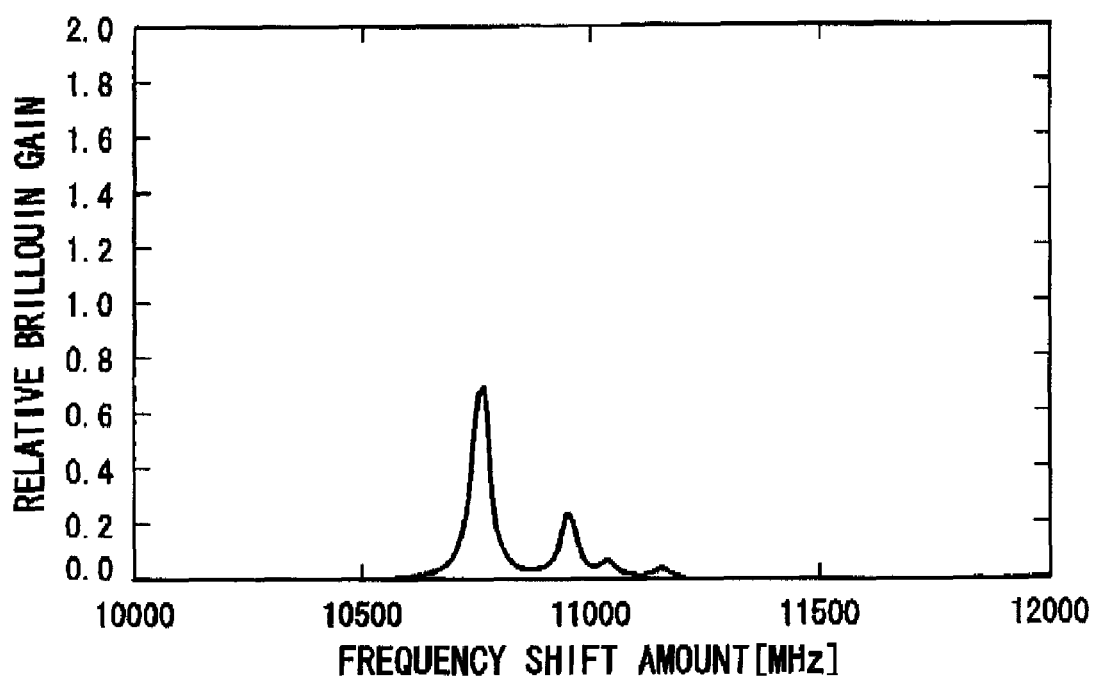
FIG. 21 is a graph showing the relative Brillouin gain spectrum of the optical fiber shown in FIGS. 20A-C.

FIG. 21 shows the relative Brillouin gain spectrum of the optical fiber obtained in the refractive index profile shown in FIGS. 20A-C. The data was standardized by assuming the maximum value of the Brillouin gain of the optical fiber of Example 1, the comparative example, as 1. The maximum relative Brillouin gain became 0.69, and the SBS threshold power became 2.9 dB smaller.

In this embodiment, there were peaks with relative gains of 0.69, 0.24, 0.06, and 0.04 at the frequency shifts of 10760 MHz, 10950 MHz, 11040 MHz, and 11160 MHz, respectively, in ascending order.

Ninth Embodiment

Figure 22A:
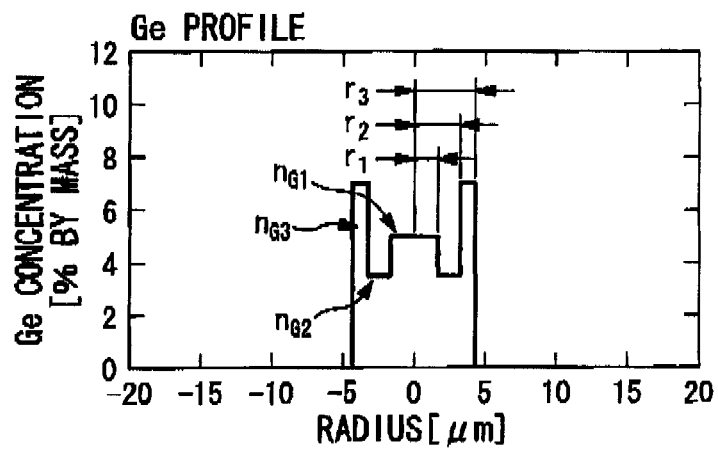
FIG. 22A is graph showing the Ge concentration profile of an optical fiber according to the exemplary technique of the present invention in a ninth embodiment.
Figure 22B:
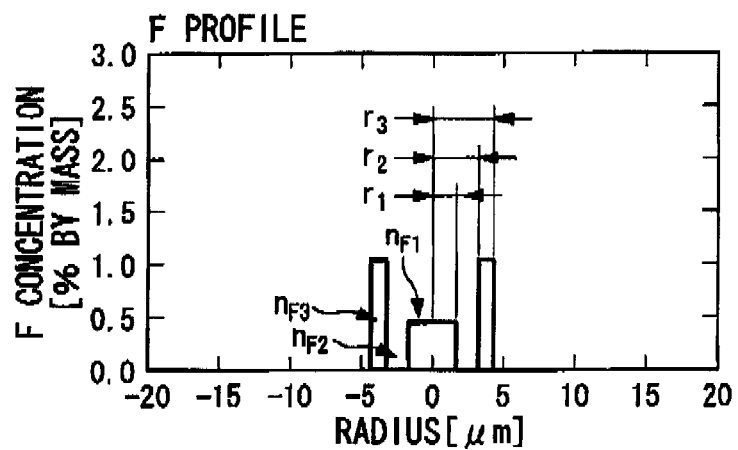
FIG. 22B is graph showing the F concentration profile of an optical fiber according to the exemplary technique of the present invention in the ninth embodiment.
Figure 22C:
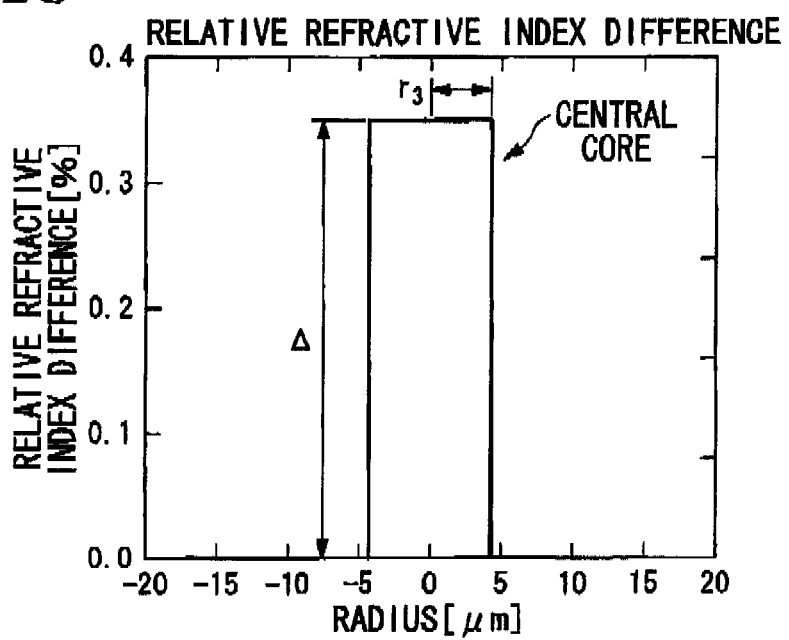
FIG. 22C is graph showing the refractive index difference profile of the optical fiber according to the exemplary technique of the present invention in the ninth embodiment.

A ninth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 22A-C. The radii, optical relative refractive index difference, and the Ge and F concentrations in each layer are shown below:

First layer radius ($r_1$): 1.66 µm.

Second layer radius ($r_2$): 3.33 µm.

Third layer radius ($r_3$): 4.43 µm.

First layer Ge concentration ($n_{G1}$): 5.0% by mass. First layer F concentration ($n_{F1}$): 0.45% by mass.

Second layer Ge concentration ($n_{G2}$): 3.5% by mass. Second layer F concentration ($n_{F2}$): 0.00% by mass.

Third layer Ge concentration ($n_{G3}$): 7.0% by mass. Third layer F concentration ($n_{F3}$): 1.05% by mass.

Relative refractive index difference ($\Delta$): 0.35%.

The Ge concentrations and the F concentrations of the first layer, the second layer, and the third layer were adjusted such that the respective relative refractive index differences $\Delta$ all became 0.35%. Thus, the optical characteristics obtained were the same those of the fourth embodiment.

Figure 23:
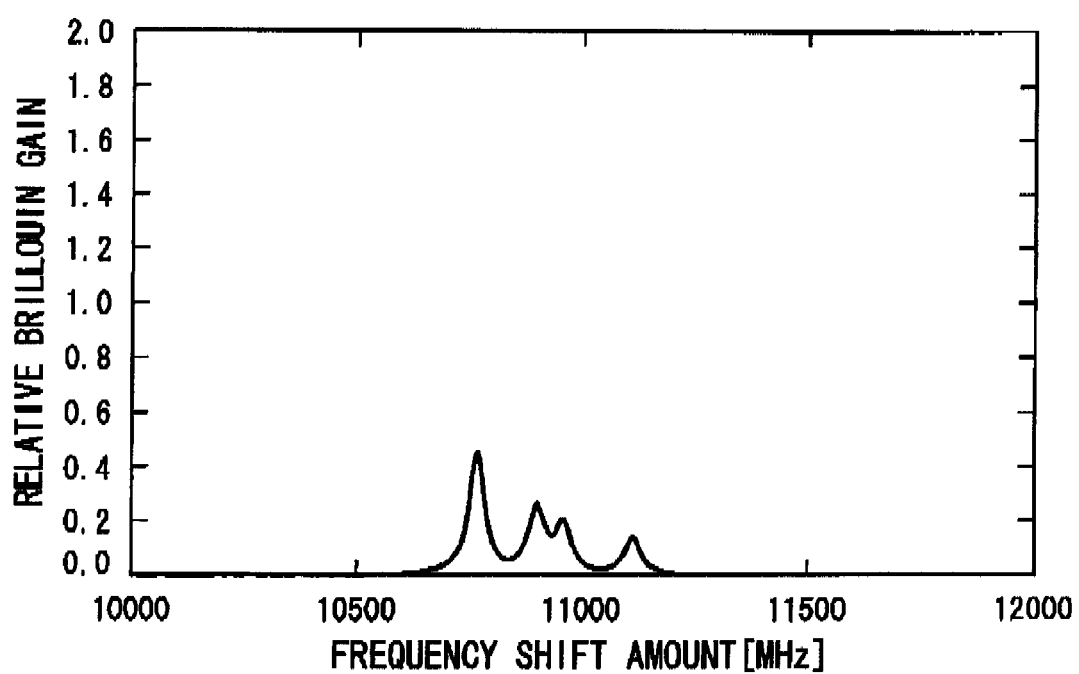
FIG. 23 is a graph showing the relative Brillouin gain spectrum of the optical fiber shown in FIGS. 22A-C.

FIG. 23 shows the relative Brillouin gain spectrum of the optical fiber obtained in the refractive index profile shown in FIGS. 22A-C. The data was standardized by assuming the maximum value of the Brillouin gain of the optical fiber of Example 1, the comparative example, as 1. The maximum relative Brillouin gain became 0.44, and the SBS threshold power became 4.0 dB smaller.

In this embodiment, there were peaks with relative gains of 0.44, 0.24, 0.18, and 0.13 at the frequency shifts of 10760 MHz, 10900 MHz, 10960 MHz, and 11120 MHz, respectively, in ascending order.

Tenth Embodiment

Figure 24A:
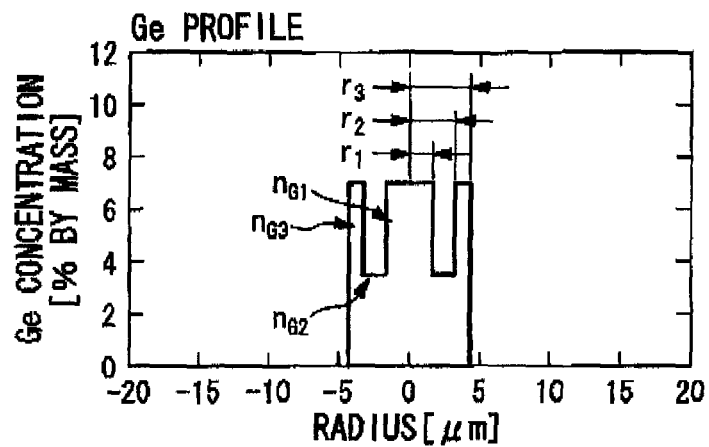
FIG. 24A is graph showing the Ge concentration profile of an optical fiber according to the exemplary technique of the present invention in a tenth embodiment.
Figure 24B:
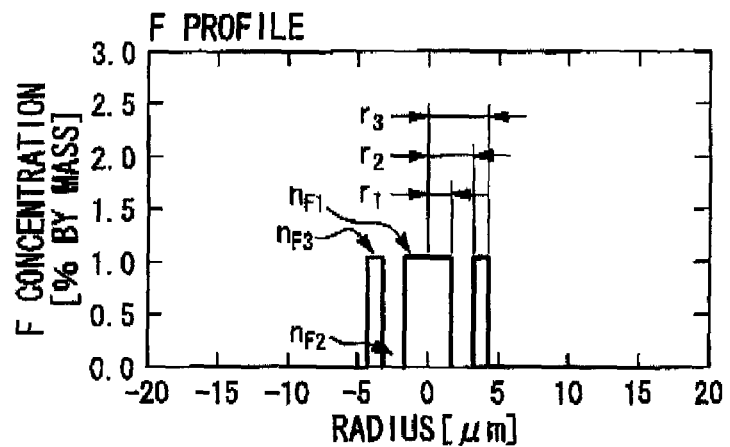
FIG. 24B is graph showing the F concentration profile of an optical fiber according to the exemplary technique of the present invention in the tenth embodiment.
Figure 24C:
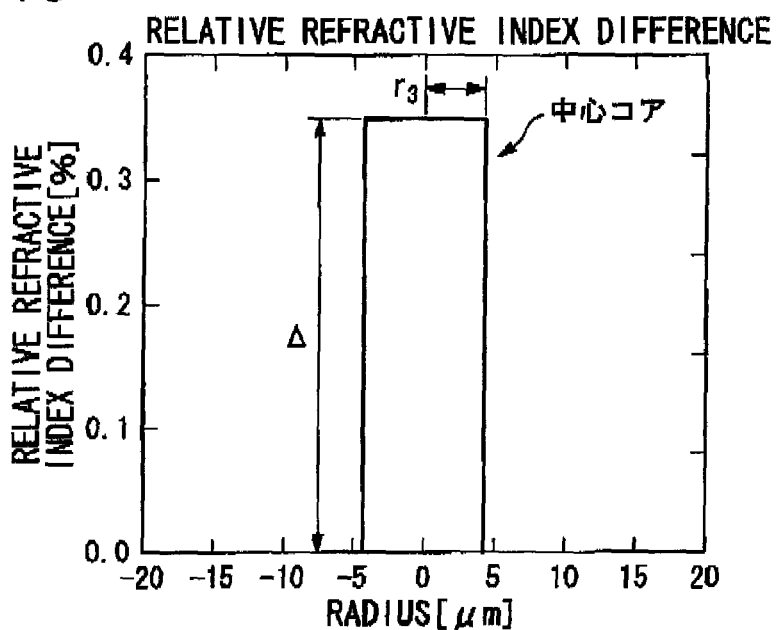
FIG. 24C is graph showing the refractive index difference profile of the optical fiber according to the exemplary technique of the present invention in the tenth embodiment.

A tenth embodiment is related to an optical fiber having a core comprising a first codoped layer in the vicinity of the center (first layer), a non-codoped layer located at the outer periphery of the first codoped layer (second layer), and a second codoped layer located at the outer periphery of the non-codoped layer (third layer). The refractive index profile and the dopant profiles of the optical fiber of this embodiment are shown in FIGS. 24A-C. The radii, optical relative refractive index difference, and the Ge and F concentrations in each layer are shown below:

First layer radius ($r_1$): 1.66 μm.

Second layer radius ($r_2$): 3.33 μm.

Third layer radius ($r_3$): 4.43 μm.

First layer Ge concentration ($n_{G1}$): 7.0% by mass. First layer F concentration ($n_{F1}$): 1.05% by mass.

Second layer Ge concentration ($n_{G2}$): 3.5% by mass. Second layer F concentration ($n_{F2}$): 0.00% by mass.

Third layer Ge concentration ($n_{G3}$): 7.0% by mass. Third layer F concentration ($n_{F3}$): 1.05% by mass.

Relative refractive index difference ($\Delta$): 0.35%.

The Ge concentrations and the F concentrations of the first layer, the second layer, and the third layer were adjusted such that the respective relative refractive index differences $\Delta$ all became 0.35%. Thus, the optical characteristics obtained were the same those of the fourth embodiment.

Figure 25:
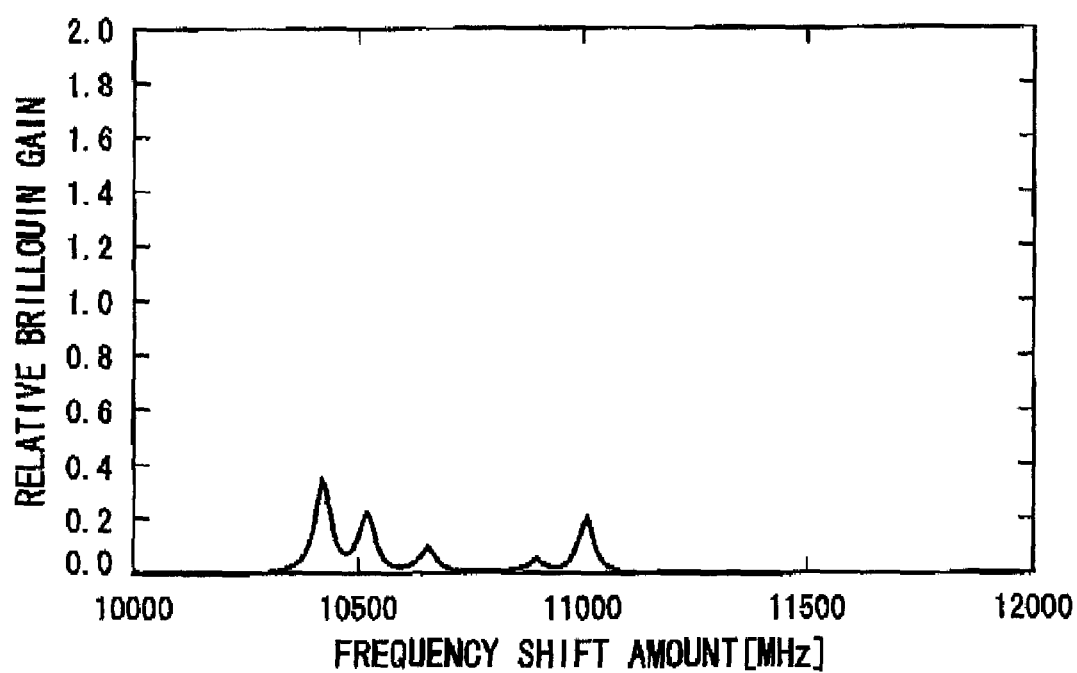
FIG. 25 is a graph showing the relative Brillouin gain spectrum of the optical fiber shown in FIGS. 24A-C.

FIG. 25 shows the relative Brillouin gain spectrum of the optical fiber obtained in the refractive index profile shown in FIGS. 24A-C. The data was standardized by assuming the maximum value of the Brillouin gain of the optical fiber of Example 1, the comparative example, as 1. The maximum relative Brillouin gain became 0.34, and the SBS threshold power became 4.7 dB smaller.

In this embodiment, there were peaks with relative gains of 0.34, 0.21, 0.09, 0.05, and 0.21 at the frequency shifts of 10420 MHz, 10520 MHz, 10660 MHz, 10900 MHz, and 11010 MHz, respectively, in ascending order.

Figure 26:
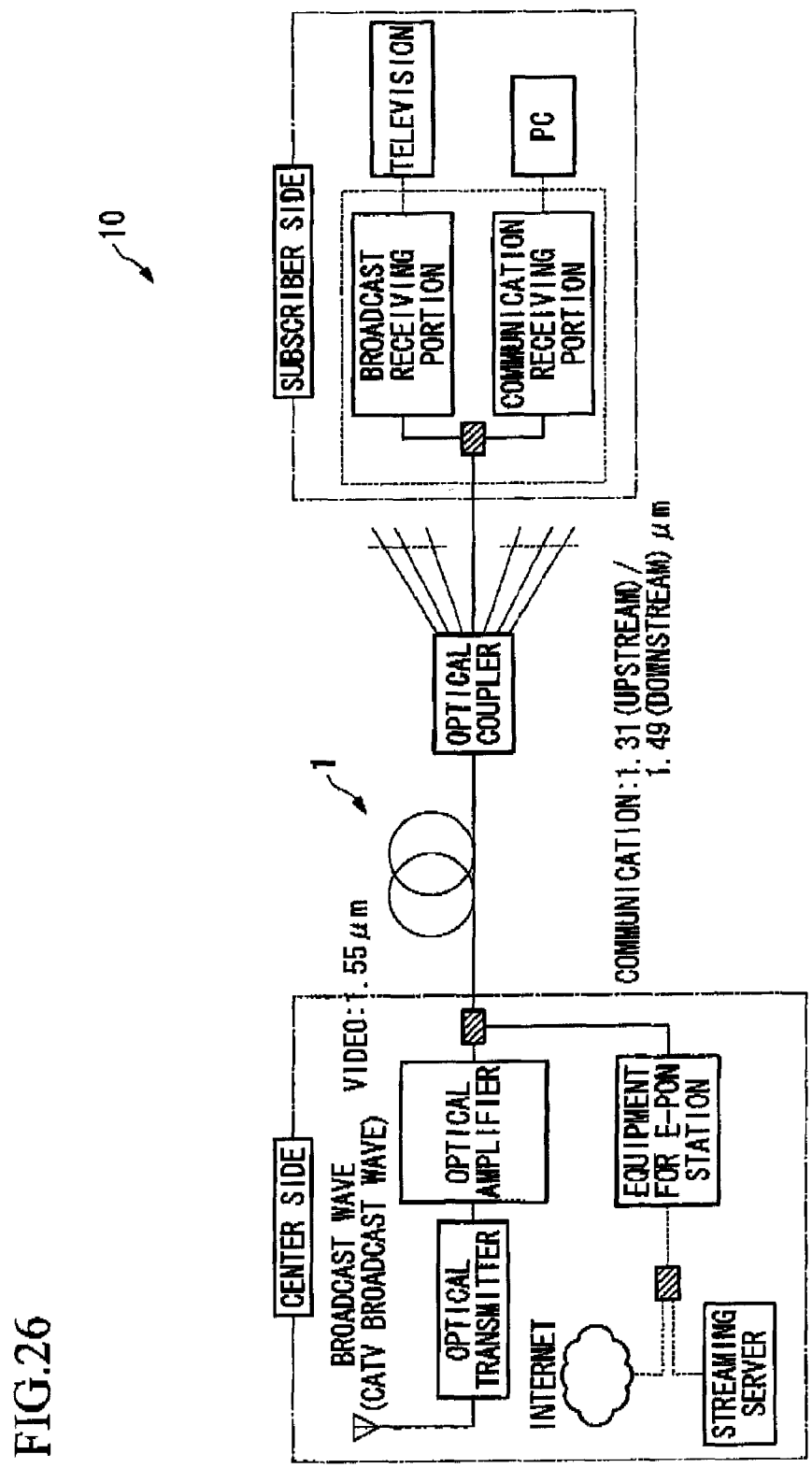
FIG. 26 shows an exemplary transmission system (wavelength division multiplexing system) configured using the optical fiber of the present invention.

FIG. 26 shows a transmission system (wavelength division multiplexing system) 10 with a PON configuration in which an the optical fiber 1 according to the present invention is used. The transmission system 10 transmits a data signal at frequencies of 1.31 μm and 1.49 μm, and an image signal at a frequency of 1.55 μm in compliance with the requirements of ITU-T G.983.3. FIG. 26 shows a digital image distribution over the Internet or by streaming, by way of example of a data transmission. However, a voice data transmission is available by adding an appropriate apparatus. For an image transmission at a frequency band of 1.55 μm, a system is widely used in which a typical broadcast wave is propagated in the form of an as-is analog signal. In such a system, a signal can be demodulated into the signal of the original broadcast wave in a receiver portion of the broadcast system on the subscriber side. Therefore, a conventional television set can be used as it is.

The system of FIG. 26 transmits a data signal and an analog signal (image signal) through the single the optical fiber 1. However, in the transmission system of the present invention, an optical fiber for a data signal and an optical fiber for an analog signal, separate from each other, may be used. In such a system, using the optical fiber of the present invention offers an advantage such as an extension in transmission distance.

While exemplary embodiments of the present invention have been described above, these should not be considered to be limitative of the invention. Addition, omission, and replacement of the constituents, and other modifications can be made without departing from the spirit or scope of the invention. The present invention is not limited by the descriptions above, but is limited only by the appended claims.

The invention claimed is:

1. An optical fiber comprising a center core and a cladding located at an outer periphery of the center core,
   wherein the center core comprises
      an inner core, located in the vicinity of a radial center of the fiber, the inner core comprising a codoped layer comprising silica glass doped with germanium and fluorine, and
      at least one lower-concentration codoped layer comprising one of:
         silica glass doped with germanium, and
         silica glass doped with germanium and fluorine;
   wherein an amount of fluorine in the at least one lower-concentration codoped layer is smaller than an amount of fluorine in the inner core; and
   wherein a concentration of germanium oxide in the inner core is in a range between 4% and 15% by mass, and a concentration of fluorine in the inner core is in a range between 0.2% and 5% by mass.

2. The optical fiber according to claim 1, wherein
   the center core further comprises an outer core provided at an outer periphery of the inner core, and
   wherein the outer core comprises the at least one lower-concentration codoped layer.

3. The optical fiber according to claim 1, wherein the cladding comprises non-doped silica glass.

4. The optical fiber according to claim 1, wherein the cladding comprises a fluorine dopant.

5. The optical fiber according to claim 4, wherein the cladding comprises an inner cladding provided at an outer periphery of the center core and an outer cladding provided at an outer periphery of the inner cladding, and the relationship: $n_{c1} < n_{c2}$ holds, wherein a refractive index of the inner cladding is $n_{c1}$ and a refractive index of the outer cladding is $n_{c2}$.

6. The optical fiber according to claim 4, wherein the cladding comprises an inner cladding provided at an outer periphery of the center core, a trench layer provided at an outer periphery of the inner cladding, and an outer cladding provided at an outside of the trench layer, and the relationships: $n_{c2} < n_{c1}$ and $n_{c2} < n_{c3}$ hold, wherein a refractive index of the inner cladding is $n_{c1}$ a refractive index of the trench layer is $n_{c2}$, and a refractive index of the outer cladding is $n_{c3}$.

7. The optical fiber according to claim 2, wherein a ratio of an inner core radius and an outer core radius is in a range between 0.10 and 0.85.

8. The optical fiber according to claim 7, wherein the ratio of the inner core radius and the outer core radius is in a range between 0.25 and 0.70.

9. The optical fiber according to claim 2, wherein optical refractive indices of the inner core and the outer core are substantially the same.

10. The optical fiber according to claim 2, wherein a relative refractive index difference between the cladding and an average of the inner core and the outer core is in a range between 0.30% and 0.60%, and an outer core diameter is in a range between 6.0 μm and 10.5 μm.

11. The optical fiber according to claim 1, wherein
    the center core comprises the inner core located in the vicinity of the radial center of the fiber, a second core provided at an outer periphery of the inner core, and a third core provided at an outer periphery of the second core, the inner core and the third core each comprise a codoped layer comprising silica glass doped with germanium and fluorine, and the second core comprises the at least one lower-concentration codoped layer.

12. The optical fiber according to claim 11, wherein the relationships: $n_{f1} > n_{f2}$ and $n_{f3} > n_{f2}$ hold, wherein a fluorine concentration of the inner core is $n_{f1}$ % by mass, a fluorine concentration of the second core is $n_{f2}$ % by mass, and a fluorine concentration of the third core is $n_{f3}$ % by mass.

13. The optical fiber according to claim 12, wherein $n_{f1}$ and $n_{f3}$ are substantially the same.

14. The optical fiber according to claim 12, wherein the relationship: $n_{f1} < n_{f3}$ holds.

15. The optical fiber according to claim 12, wherein the relationship: $n_{f1} > n_{f3}$ holds.

16. A transmission system comprising:
means for performing at least one of an analog signal transmission and a baseband transmission; and
the optical fiber according to claim 1.

17. A wavelength division multiplexing system comprising:
means for performing at least one of a data transmission and a voice transmission;
means for performing at least one of an analog signal transmission and a baseband transmission; and
the optical fiber according to claim 1.

18. The optical fiber according to claim 11, wherein optical refractive indices of the inner core, the second core, and the third core are substantially the same.

19. The optical fiber according to claim 9, wherein a relative refractive index difference between the inner core and the outer core is about 0.07% or less.

* * * * *